United States Patent [19]

Hayashi et al.

[11] Patent Number: 6,041,145
[45] Date of Patent: Mar. 21, 2000

[54] DEVICE AND METHOD FOR SMOOTHING PICTURE SIGNAL, DEVICE AND METHOD FOR ENCODING PICTURE AND DEVICE AND METHOD FOR DECODING PICTURE

[75] Inventors: Takaaki Hayashi, Fukuoka; Minoru Etoh, Katano, both of Japan

[73] Assignee: Matsushita Electric Industrial Co., Ltd., Japan

[21] Appl. No.: 09/115,907

[22] Filed: Jul. 15, 1998

Related U.S. Application Data

[63] Continuation-in-part of application No. 08/742,909, Nov. 1, 1996, abandoned.

[30]      Foreign Application Priority Data

Nov. 2, 1995  [JP]  Japan .................................... 7-285838
Nov. 5, 1996  [JP]  Japan .................................... 8-292447

[51] Int. Cl.⁷ ............................. G06K 9/40; G06K 9/36
[52] U.S. Cl. ......................... 382/268; 382/262; 382/233
[58] Field of Search .................... 382/268, 262, 382/266, 233; 358/433; 348/416, 420, 403, 407, 699, 398, 413, 415

[56]                References Cited

U.S. PATENT DOCUMENTS 5,367,385  11/1994  Yuan ....................................... 358/432
5,608,652   3/1997  Astle ................................... 364/715.02
5,610,729   3/1997  Nakajima ............................... 358/433

FOREIGN PATENT DOCUMENTS 0 593 099 A1  4/1994  European Pat. Off. ......... H04N 7/13
5-29195       4/1993  Japan .............................. H04N 7/13
2 287 153     9/1995  United Kingdom ............. H04N 5/21

OTHER PUBLICATIONS

Computer Graphics & Image Processing 15, pp. 167–181 (1981), "Gradient Inverse Weighted Smoothing Scheme & The Evaluation of Its Performance" by Wang et al.

Technical Report of IEICE, IE94–7 DSP94–7 (1994–04), "Postprocessing Algorithms for Noise Reduction of MPEG Coded Video" by Nakajima.

Technical Report of IEICE84–46, "Study of the Method for Improving the Image Quality of Block Encoding Picture by Post Filter Process" by Mitsuya et al.

"Motion Video Coding for Visual Telephony"; Ronald Plompen; 1990, PTT Research Neher Labs, NL, Leidschendam XP002096009 198180 *p. 179–p. 208*.

"On the Gradient Inverse Weighted Filter"; Wang Xin; IEEE Transactions on Signal Processing, vol. 40, No. 2; Feb. 1, 1992, pp. 482–484, XP000292345 *the whole document*.

*Primary Examiner*—Thomas D. Lee
*Assistant Examiner*—Wenpeng Chen
*Attorney, Agent, or Firm*—Parkhurst & Wendell, L.L.P

[57]                 ABSTRACT

A great decrease of a step, i.e., block distortion, of such as unnatural, abnormal or artifact brightness and color, on a block boundary, leads to much visual improvement of picture quality. Against a picture that has been encoded and decoded by block, the smoothing filter characteristics is changed according to quantizing parameter, block activity of a decoded picture, the activity of each pixel of the decoded picture, and the position with respect to a block boundary of a pixel. A smoothing filter utilizes a weighted mean whose weight is the inverse number of a difference between a target pixel and its surrounding pixels. The weighted mean is obtained by adding a certain number to a weight before taking its inverse number. The value to be added is controlled by the parameter. Similarly, the mixing ratio of a pixel value after performing the smoothing filter and a decoded pixel value is changed depending on the parameter. A filter having strong edge preserving property is utilized for the inside of a block, and a filter having weak edge preserving property is utilized for a block boundary. A filter having edge preserving property is utilized for the post/loop filter.

28 Claims, 18 Drawing Sheets four corners up and down ends right and left ends inside

DEVICE AND METHOD FOR SMOOTHING PICTURE SIGNAL, DEVICE AND METHOD FOR ENCODING PICTURE AND DEVICE AND METHOD FOR DECODING PICTURE

This application is a Rule 1.53(b) Continuation-in-Part application of U.S. Ser. No. 08/742,909, filed Nov. 1, 1996, now abandoned.

FIELD OF THE INVENTION

The present invention relates to a picture signal smoothing device, i.e., a picture filter, and its method in which against a picture that has been encoded and decoded by block, a smoothing filter processing whose strength changes depending on quantizing parameter and block activity of a decoded picture, is performed on each pixel position to obtain high quality picture free from unnatural, abnormal or artifact noise; and a picture encoding device and its method, and a picture decoding device and its method, all of which utilize the above filter as a postfilter or a loop filter.

BACKGROUND OF THE INVENTION

In order to encode a picture signal at high efficiency, there has been frequently used a moving picture encoding and decoding system and its device that appropriately encode a picture signal mainly by block. As a typical one, TV Conference system based on International Telegraph and Telephone Standard (ITU-T H. 261 standard) is generally used. By such encoding systems, however, a block-shaped step, i.e., block noise, due to quantizing error is perceived in a decoded picture. Further, it is known that if there is a rapid pixel change such as a character on a flat background, pseudo edge called as mosquito noise occurs in its surrounding. The block-shaped noise can be observed when a step of unnatural, abnormal or artifact brightness, color and the like occurs on a block boundary. In prior art techniques, a smoothing filter for decreasing such a step is utilized against the entire decoded picture or a pixel that exists on the block boundary, to reduce the block-shaped noise.

FIG. 24 is a block diagram of an inter-frame encoding and decoding system of the ITU-T H. 261 standard, and indicates the position at which block-shaped noise reducing process is performed. In this figure, a subtracter 11 generates a difference between an input picture signal 10 and a picture signal 24 of the previous frame that has been encoded, decoded and reconstituted. The difference is encoded in an encoder 12 by means of DCT, quantization and Huffman coding. An encoded error signal 13 is transmitted to a decoder 25, and is again returned to a difference signal in a local decoder 14 by means of inverse Huffman coding, inverse quantization and inverse DCT. This difference signal 15 contains operation errors in the encoder 12 and the local decoder 14, resulting in a value different from the difference generated in the subtracter 11.

Then, the difference signal 15 and the picture signal 24 of the previous frame are added in an adder 16 to generate a picture signal 17, which is then stored in a frame memory 18, standing by for the next picture signal input. In these operations, the processing is performed by block of a picture divided into 8×8 dot size.

When taking, in the subtracter 11, the difference between the input picture signal 10 and the previous picture signal 24 from the frame memory 18, there is generally employed technique called motion estimation and compensation. This technique is performed by a motion vector detector 19. Specifically, to obtain a difference between a signal stored in the frame memory 18 and an input signal, the detector 19 reads out the previous picture signal 21 from the frame memory 18, and slide the signal 21 up and down, and right and left, to obtain differences, thereafter, select a slide quantity with which the difference becomes the smallest, as a motion vector 22, which is then transmitted to a decoding side by multiplexing with an error signal 13 that has been multiplexed by a multiplexer 29a. The motion vector 22 is returned to the frame memory 18 as an address signal, to obtain a motion compensation predictive signal 20. The constitution of the encoder side is as mentioned above.

In the decoder side, a transmitted difference signal 13 is decoded in the decoder 25 by means of inverse Huffman coding, inverse quantization, and inverse DCT and motion vector extraction, and the motion vector 22' is given to the motion compensation frame memory 18' to read the motion compensation predictive signal 20' obtained by sliding, from the frame memory 18'. The difference signal 15' decoded in the decoder 25, and the signal 20' read out from the frame memory 18' are added in the adder 16' to generate a picture signal 17, i.e., a local decoded signal. Against the picture signal 17 thus encoded, decoded and reconstruted, a filtering using a postfilter 26 is performed. Alternatively, a filtering using a filter inside loop 23 is performed on the output from the frame memory 18, to reduce a block-shaped noise. Prior art techniques utilized in the above filterings will be described.

As a prior art 1, there is discussed the technique disclosed in "Study of the Method for Improving the Image Quality of Block Encoding Picture by Post Filter Process" by Mitsuya et al. (TECHNICAL REPORT OF IEICE, IE84-46), as shown in FIG. 22. In this technique, the filtering is limited to a block that has less brightness change of an obtained decoded picture, in other words, a block at whose boundary a block distortion is liable to be actualized. That is, a strong smoothing filtering is performed only on a pixel 50 on a block boundary. This filtering is performed by a low-pass filter (hereinafter referred to as "LPF") that takes a simple average of equal weight against nine pixels of a target pixel 40 and its surrounding eight pixels 41 to 48 in FIG. 21. In this figure, numerals 51 and 52 designate a pixel inside a block and a block boundary, respectively.

As a prior art 2, there is discussed the technique described in "Postprocessing Algorithms for Noise Reduction of MPEG Coded Video" by Nakajima et al. (TECHNICAL REPORT OF IEICE, IE94-7, DSP94-7 (1994-04), (hereinafter referred to as "technique of Nakajima")). In the technique of Nakajima, the mixing ratio of a decoded pixel value and a simple average of its surrounding pixel values is changed appropriately depending on the local activity of a picture, quantizing parameter, block activity and the position relation with a block boundary.

Assuming that a local region of the surrounding of the target pixel is a picture region (hereinafter referred to as "local region") of 3×3 pixels as shown in FIG. 21, and that a region (hereinafter referred to as "picture block")in which $\sigma_b^2$ (block activity) is computed is a region of 8×8 pixel in which DCT operation as shown in FIG. 20 is performed, the quantizing parameter in decoding is stored for each picture block.

In the local region as shown in FIG. 20, a local average $<d(x, y)>$ is defined by the equation (1) for each of the entire pixels of a decoded picture.

In taking the sum ($\Sigma$) of the local averages, if a pixel is outside the range of a picture region depending on the values of i and j, the value of a target pixel is employed instead of the pixel outside of the picture range. Note that d(x, y) is a decoded pixel value of the coordinate (x, y).

$$\langle d(x, y)\rangle = \frac{1}{9}\sum_{i=-1}^{+1}\sum_{j=-1}^{+1} d(x+i, y+j) \qquad (1)$$

Then, each pixel dispersion (hereinafter referred to as "local activity") as defined by the equation (2) is obtained in the local region. As the definition of the dispersion, the sum of the square the difference between the local region and the local average of the equation (1) is obtained in each pixel as in the equation (1).

$$\sigma_d^2(x, y) = \frac{1}{9}\sum_{i=-1}^{+1}\sum_{j=-1}^{+1}(d(x+i, y+j) - \langle d(x, y)\rangle)^2 \qquad (2)$$

Picture block dispersion (hereinafter referred to as "block activity") is defined by the equation (3). The block activity is defined for each of the picture blocks $B_{00}$ to $B_{22}$, as shown in FIG. 20.

$$\sigma_{bavg}^2(x, y) = \frac{1}{64}\sum_{t=0}^{+7}\sum_{k=0}^{+7}\sigma_d^2(x_b+k, y_b+1) \qquad (3)$$

wherein $x_b$, $y_b$ are values of the upper left corner coordinate that belongs to the picture block number $b_n$.

An m(x, y), d(x, y) and <d(x, y)> are respectively, a corrected pixel value, a decoded pixel value and a simple average pixel value of a local region, in the coordinate (x, y).

$$m(x, y) = (1-\beta)\langle d(x, y)\rangle + \beta d(x, y) \qquad (4)$$

Here, β is a mixing ratio of a decoded value and a value smoothed in the local region.

$$\beta = \frac{\sigma_d^2(x, y) - \sigma n^2(x, y)}{\sigma_d^2(x, y)} \qquad (5)$$

In the pixel inside the picture block, $$\sigma_n^2(x, y) = \sigma_{bn}^2 \frac{\sigma_{bavg}^2}{\sigma_d^2(x, y)} \qquad (6)$$

In the pixel on the picture block boundary, $$\sigma_n^2(x, y) = \sigma_{bn}^2 \qquad (7)$$

In this case, $\sigma_{bn}^2$ is a functional value whose variable are quantizing parameter and block activity, and also the experimental value illustrated with the graph in the report. In accordance with the report of Nakajima, β in the above equation (4) is changed so as to increase the proportion of the simple average, in the event that various picture noises are liable to occur, that is, under the following conditions:
a. when quantizing parameter is rough;
b. when block activity is high;
c. when noise occurs in a certain region of a picture; and
d. when a sharp edge exists inside a picture block.

As a prior art 3, a description will be given of the technique of "Gradient Inverse Weighted Smoothing Scheme and the Evaluation of its Performance" by D. C. C. Wang, A. H. Vagnucci and C. C. Li (Comp. Graphics Image Processing, Vol. 15, pp.167–181, 1981) (hereinafter referred to as "technique of Wang"). The technique of Wang is one which takes weighted mean of a target pixel and its surrounding pixels. Its weighting factor is the inverse number of the absolute value of the difference between the target pixel and its surrounding pixels, and defined by the following equations (8) to (11), wherein d(x, y) is a decoded pixel value of the coordinate (x, y); and m(x, y) is a pixel value after taking weighted mean in the coordinate (x, y).

$$m(x, y) = \frac{\sum_{i=-1}^{+1}\sum_{j=-1}^{+1} w(i, j)d(x+i, y+j)}{\sum_{i=-1}^{+1}\sum_{j=-1}^{+1} w(i, j)} \qquad (8)$$

where, $$\Delta DD_{ij}(x, y) = |d(x+i, y+j) - d(x, y)| \qquad (9)$$

provided that when $\Delta_{ij}(x, y) = 0$, set $\Delta D_{ij}(x, y) = 2$, $$w(i, j) = \frac{1}{\Delta D_{ij}(x, y)} \qquad (i, j = -1, 0, +1) \qquad (10)$$

where $$w(0, 0) = \frac{1}{2} \text{ and } \sum_{i=-1}^{+1}\sum_{j=-1}^{+1} w(i, j) = \frac{1}{2} \qquad (11)$$

(i and j are not 0 at the same time)

In this technique, if the difference between a target pixel and its surrounding pixels is small, the weighting factor increases, so that the surrounding pixels are homogenized with a filtered target pixel value. On the contrary, if the difference is great, i.e., if an edge exists, the weighting factor decreases, leading to a filtering that preserves the edge.

As a prior art 4, there will be discussed the technique of a filter utilized in ITU-T advice H. 261 (hereinafter referred to as "H. 261 standard") which was approved by World Telecommunication Standardization Commission. The above filter is employed for an output of a frame memory in which a picture signal of the preceding frame is stored, that is, before obtaining a difference between the present picture signal and an input picture signal (see an in-loop filter 23 in FIG. 24). The output of the above frame memory is filtered by 8×8 picture blocks.

The above filter is constituted by operating a primary filter horizontally or vertically, that is, a non-recursive filter having coefficients of ¼, ½, ¼ against a pixel inside a picture block. In cases where a pixel employed in filter operation is outside the picture block, the above filter functions as a primary filter having coefficients of 0, 1, 0. The filter coefficient at the respective position of the 8×8 picture blocks are indicated in FIG. 23, wherein numerals 61, 62, 63 and 64 designate filter coefficients in four corners, up and down ends, right and left ends, and an inner region, respectively. For the up and down ends, and the left and right ends, there are six pixels respectively. In the inner region, there are 36 pixels. The filter coefficient is slided when applying to each pixel.

In these basic filters of the prior art constitution, however, edge information that is inherently possessed by a picture except block noise is to be reduced because uniform filtering is performed on the entire decoded picture. In the case where only a block boundary is filtered using the technique of Mitsuya, when a continuous stroke originally crosses the block boundary, the continuous stroke blurs only on the block boundary. As a result, an observer will have an impression that such a block boundary is unnatural, abnormal or artifact.

The technique of Nakajima utilizes a mixture of a simple average of a decoded pixel value and its surrounding pixels values, so that its filtering blurs edge information within a picture block. Further, as defined in the equation (4), the proportion of a filter having no edge preserving property is enhanced on block boundaries, causing the same problem as in the technique of Mitsuya.

In the technique of Wang having the edge preserving property, the weighting factor of a target pixel is fixed at ½, and therefore, plural processing are needed in the identical picture. Further, the replacement of a weighting factor when a pixel difference value $\Delta D_{ij}$ is 0, may underestimate the weighting factor. Since this technique does not take into consideration block noise phenomenon on a block boundary, which occurs in dividing a picture into blocks, a step of a block boundary might be erroneously recognized as an edge to be processed.

The filter of the H. 261 standard also does not have the edge preserving property, causing a blur of a decoded picture.

SUMMARY OF THE INVENTION

It is an object of the present invention to provide a picture signal smoothing device and its method that can reduce the deterioration of a decoded picture while suppressing a decrease in resolution of the entire picture.

It is a further object of the present invention to provide a picture encoding device and its method that can reduce deterioration of a decoded picture while suppressing a decrease in resolution of the entire picture.

It is a further object of the present invention to provide a picture decoding device and its method that can reduce deterioration of a decoded picture while suppressing a decrease in resolution of the entire picture.

Other objects and advantages of the present invention will become apparent from the detailed description given hereinafter; it should be understood, however, that the detailed description and specific embodiment are given. by way of illustration only, since various changes and modifications within the scope of the invention will become apparent to the those skilled in the art from this detailed description.

According to a first aspect of the present invention, a picture signal smoothing device that performs a smoothing process is performed by applying a smoothing filter in which a sampled and digitized picture signal is filtered by weighted mean of a target pixel and its surrounding pixels, includes means for detecting a difference between a target pixel and its surrounding pixels; means for taking the absolute value that represents a magnitude of the difference; means for adding a non-negative value (m) to the absolute value that represents a magnitude of the difference thus detected; means for taking the inverse number (weighting factor) of the value after the adding; means for multiplying the value after taking of the inverse number and the surrounding pixels values together; means for taking a sum (A) of the value after the multiplying; means for taking a sum (B) of the inverse number (the weighting factor) alone; and means for dividing the sum (A) by the sum (B) of the weighting factor and normalizing (A/B).

Since the smoothing is performed by the inverse number of a difference value, if a target pixel is an isolated point, a difference value between the target pixel and each of its surrounding pixels is great, so that every surrounding has a similar weight. In the case where an edge exists near a target pixel, although the difference between the target pixel and the edge is great, the difference between the target pixel and its surrounding pixel except the edge is small. This leads to a constitution in which weighted mean is taken such that the weight of the edge side is small. A continuous edge can be preserved by this constitution, and the isolated point can be smoothed. In addition, by adding a non-negative value, the degree of noise influence can be controlled in the operation, and there is no possibility that the operation result after taking the inverse number is infinity.

According to a second aspect of the present invention, the picture signal smoothing device of the first aspect includes means for diving a picture to be filtered into blocks; and means for appropriately changing a non-negative value to be added to the difference value between the target pixel and its surrounding pixels, according to the roughness of quantizing parameter of each block that is represented by quantizing characteristics utilized in encoding or decoding each block of a picture signal.

Therefore, by controlling a non-negative value added prior to taking the inverse number in computing a weighting factor, using quantizing parameter, it is possible to erase noise that enlarges with enlarging quantizing error.

According to a third aspect of the present invention, the picture signal smoothing device of the first aspect includes means for dividing a picture to be filtered into blocks; means for computing a block activity indicating a change degree of a pixel by block; and means for appropriately changing a non-negative value to be added to a difference value between the target pixel and its surrounding pixels, according to the respective block activity.

When a picture is flat and has low block activity, it is easy to observe noise. In such a case, however, it is possible to prevent noise from being recognized by enlarging a noise recognizable width and enhancing flat smoothing characteristics.

According to a fourth aspect of the present invention, the picture signal smoothing device of the first aspect includes means for dividing a picture to be filtered into blocks; means for detecting whether a target pixel exists on a block boundary; means that if the target pixel exists on a block boundary, detects a block activity (adjacent block activity) of a block adjacent to the block boundary; and means for appropriately changing a non-negative value to be added to the difference value between the target pixel and its surrounding pixels, according to the adjacent block activity.

When a picture is adjacent to a flat block, on its boundary, a continuous edge of brightness (hue) often occurs. In such a case, therefore, by detecting that an adjacent block is flat and has low block activity, the smoothing characteristics of a point at which the flat block touches is enhanced to blur the step on the boundary.

According to a fifth aspect of the present invention, the picture signal smoothing device of the first aspect includes means for dividing a picture to be filtered into blocks; means for mixing a signal value after the smoothing process by block, and a signal value prior to the smoothing process; means for appropriately changing the mixing ratio according to the roughness of quantizing parameter of each block that is represented by quantizing property utilized in encoding and decoding each block of a picture signal.

Therefore, the constitution that the final filtering value of a target pixel is obtained by mixing the smoothed signal value and the signal value prior to the smoothing, allows to change the filtering characteristics by picture block, according to the respective pixel character. When a quantizing parameter is 1, no quantizing error occurs, and therefore, no further process is required against the value after the final filtering, that is, the signal prior to the smoothing can be utilized as it is. This leads to the constitution that the mixing ratio is controlled by quantizing parameter, and it is possible that a smoothed signal value is not utilized in the filtering.

According to a sixth aspect of the present invention, the picture signal smoothing device of the first aspect includes means for dividing a picture to be filtered into blocks; means for mixing a signal value after the smoothing process by block, and a signal value prior to the smoothing process; means for appropriately changing the mixing ratio according to the respective block activity in a picture signal.

Thus, for a flat block having low block activity, by making the final filtering value include more smoothed and flat signal values, it is possible to erase noise that is noticeable in a flat block.

According to a seventh aspect of the present invention, the picture signal smoothing device of the first aspect includes means for dividing a picture to be filtered into blocks; means for mixing a signal value after the smoothing process by block, and a signal value prior to the smoothing process; means for detecting whether a target pixel exists on a block boundary; and means that if the target pixel exists on a block boundary, appropriately changes the mixing ratio according to an adjacent block activity of a block adjacent to the target pixel.

When a picture is adjacent to a flat block having low block activity, on its boundary, a continuous edge of brightness (hue) often occurs. In such a case, therefore, by detecting that an adjacent block is flat, the flatness of filtering characteristics of a point at which the flat block touches is enhanced to blur the boundary.

According to an eighth first aspect of the present invention, a picture signal smoothing device in which a filtering of a sampled and digitized picture signal is performed by a smoothing filter, includes means for dividing a picture to be filtered into blocks; means for detecting whether a target pixel exists on a block boundary; means for performing a filtering whose edge preserving property is weakened, if the target pixel exists on a block boundary; and means for performing a filtering having edge preserving property if the target pixel exists inside a block.

Therefore, by enhancing the edge preserving property inside a block and weakening it on a block boundary, it is possible to perform a filtering that retains edge being important element of a picture signal as much as possible.

According to a ninth aspect of the present invention, the picture signal smoothing device of the eighth aspect includes means for dividing a picture to be filtered into blocks; means for detecting whether a target pixel exists on a block boundary; means for computing the activity of the target pixel from the target pixel value and its surrounding pixels values; and means that if the target exists on a block boundary, appropriately changes the strength of edge preserving property of a filter according to the activity of the target pixel.

When a target pixel exists on a block boundary and its activity is high, a step often occurs on the block boundary. In such a case, therefore, by increasing the flatness of smoothing characteristics and the proportion of smoothing characteristics in filtering characteristics, such a step can be erased.

According to a tenth aspect of the present invention, the picture signal smoothing device of the eighth aspect includes means for dividing a picture to be filtered into blocks; means for detecting whether a target pixel exists on a block boundary; means for detecting whether a block boundary on which the target pixel exists, continues horizontally or vertically; and means for appropriately changing the strength of edge preserving property according to the direction of the block boundary to which the target pixel belongs.

Since a block noise occurs in the direction that a block boundary continues, by less preserving edge in that direction, it is possible to erase a block noise while strongly preserving an edge being vertical with respect to the block boundary.

According to an eleventh aspect of the present invention, a picture signal smoothing method in which a smoothing process is performed by applying a smoothing filter that performs a filtering of a sampled and digitized picture signal by weighted mean of a target pixel and its surrounding pixels, includes the steps of detecting a difference between a target pixel and its surrounding pixels; taking the absolute value that represents a magnitude of the difference; adding a non-negative value (m) to the absolute value that represents a magnitude of the difference thus detected; taking the inverse number (weighting factor) of the value after the adding; multiplying the value after taking of the inverse number and the surrounding pixels values together; taking a sum (A) of the value after the multiplying; taking a sum (B) of the inverse number (the weighting factor) alone; and dividing the sum (A) by the sum (B) of the weighting factor and normalizing (A/B).

Since the smoothing is performed by the inverse number of a difference value, if a target pixel is an isolated point, a difference value between the target pixel and each of its surrounding pixels is great, so that the entire surrounding has a similar weight. In the case where an edge exist near a target pixel, although the difference between the target pixel and the edge is great, the difference between the target pixel and its surrounding pixel except the edge is small. This leads to a constitution in which a weighted mean is taken such that the weight of the edge side is small. A continuous edge can be preserved by this constitution, and the isolated point can be smoothed. In addition, by adding a non-negative value, the degree of noise influence can be controlled in the operation, and there is no possibility that the operation result after taking the inverse number is infinity.

According to a twelfth aspect of the present invention, the picture signal smoothing method of the eleventh aspect includes the steps of diving a picture to be filtered into blocks; and appropriately changing a non-negative value to be added to the difference value between the target pixel and its surrounding pixels, according to the roughness of quantizing parameter in each block, which is represented by quantizing characteristics utilized in encoding and decoding each block of a picture signal.

Therefore, by controlling a non-negative value that is added prior to taking the inverse number in computing a weighting factor, using quantizing parameter, it is possible to erase noise that enlarges with enlarging quantizing error.

According to a thirteenth aspect of the present invention, the picture signal smoothing method of the eleventh aspect includes the steps of dividing a picture being to be filtered into blocks; computing a block activity indicating a change degree of a pixel, by block; and appropriately changing a non-negative value to be added to a difference value between the target pixel and its surrounding pixels, according to the respective block activity.

When a picture is flat and has low block activity, it is easy to observe noise. In such a case, however, it is possible to prevent noise from being recognized by enlarging a noise recognizable width and enhancing flat smoothing characteristics.

According to a fourteenth aspect of the present invention, the picture signal smoothing method of the eleventh aspect includes the steps of dividing a picture to be filtered into blocks; detecting whether a target pixel exists on a block boundary; if the target pixel exists on a block boundary, detecting a block activity (adjacent block activity) of a block adjacent to the block boundary; appropriately changing a non-negative value to be added to the difference value between the target pixel and its surrounding pixels, according to the adjacent block activity.

When a picture is adjacent to a flat block, on its boundary, a continuous edge of brightness (hue) often occurs. In such a case, therefore, by detecting that an adjacent block is flat having low block activity, the flatness of the smoothing characteristics of a point at which the flat block touches is enhanced to blur the step on the boundary.

According to a fifteenth aspect of the present invention, the picture signal smoothing method of the eleventh aspect includes the steps of dividing a picture to be filtered into blocks; mixing a signal value after the smoothing process by block, and a signal value prior to the smoothing process; and appropriately changing the mixing ratio according to the roughness of quantizing parameter of each block, which is represented by quantizing characteristics utilized in encoding and decoding each block of a picture signal.

Therefore, the constitution in which the final filtering value of a target pixel is obtained by mixing the smoothed signal value and the signal value prior to the smoothing, allows to change the filtering characteristics of each picture block, according to the respective pixel character. When the quantizing parameter is 1, no quantizing error occurs, and therefore, no further process is required against the value after the final filtering, that is, the previous signal can be utilized as it is. This leads to the constitution that the mixing ratio is controlled by the quantizing parameter, and it is possible that a smoothed signal value is not utilized in the filtering.

According to a sixteenth aspect of the present invention, the picture signal smoothing method of the eleventh aspect includes the steps of dividing a picture being to be filtered into blocks; mixing a signal value after the smoothing process by block, and a signal value prior to the smoothing process; and appropriately changing the mixing ratio according to the respective block activity in a picture signal.

Thus, for a flat block having low block activity, by making the final filtering value include more smoothed and flat signal values, it is possible to erase noise being noticeable in a flat block.

According to a seventeenth aspect of the present invention, the picture signal smoothing method of the eleventh aspect includes the steps of dividing a picture to be filtered into blocks; mixing a signal value after the smoothing process by block, and a signal value prior to the smoothing process; detecting whether a target pixel exists on a block boundary; and if the target pixel exists on a block boundary, appropriately changing the mixing ratio according to an adjacent block activity of an adjacent block that touches the target pixel.

When a picture is adjacent to a flat block having low block activity, on its boundary, a continuous edge of brightness (hue) often occurs. In such a case, therefore, by detecting that an adjacent block is flat, the flatness of the filtering characteristics of a point at which the flat block touches is enhanced to blur the boundary.

According to an eighteenth aspect of the present invention, a picture signal smoothing method in which a filtering of a sampled and digitized picture signal is performed by a smoothing filter, includes the steps of dividing a picture to be filtered into blocks; detecting whether a target pixel exists on a block boundary; performing a filtering whose edge preserving property is weakened, if the target pixel exists on a block boundary; and performing a filtering having edge preserving property if the target pixel exists inside a block.

Therefore, by enhancing edge preserving property inside a block and weakening it on a block boundary, it is possible to perform a filtering that retains edge being important element of a picture signal as much as possible.

According to a nineteenth aspect of the present invention, the picture signal smoothing method of the eighteenth aspect includes the steps of dividing a picture to be filtered into blocks; detecting whether a target pixel exists on a block boundary; computing an activity of the target pixel from the target pixel value and its surrounding pixels values; and appropriately changing the strength of edge preserving property of a filter according to the activity of the target pixel, if the target pixel exists on a block boundary.

When a target pixel exists on a block boundary and its activity is high, a step often occurs on the block boundary. In such a case, therefore, by increasing the flatness of smoothing characteristics and the proportion of smoothing characteristics in filtering characteristic, such a step can be erased.

According to a twentieth aspect of the present invention, the picture signal smoothing method of the eighteenth aspect includes the steps of dividing a picture to be filtered into blocks; detecting whether a target pixel exists on a block boundary; detecting whether a block boundary at which the target pixel exists, continues horizontally or vertically; and appropriately changing the strength of edge preserving property according to the direction of the block boundary to which the target pixel belongs.

Since a block noise occurs in the direction that a block boundary continues, the employment of a filter that weakly preserves the edge in that direction, allows to erase a block noise while strongly preserving the edge being vertical with respect to the block boundary.

According to a twenty-first aspect of the present invention, a picture encoding device in which a filter is attached to a decoding loop having a frame memory for storing a signal corresponding to one or a plurality of frames or fields, and an inter-frame encoding is performed by a corresponding pixel between an input signal and the frame memory, is characterized in that a filter having edge preserving property is employed as the above filter, and a picture signal after being processed in a picture signal smoothing device is input, as a local decoding signal, to the frame memory storing a picture signal of the previous frame.

Thus, the construction that a pixel value after the filtering is written to a decoded signal in the frame memory, allows to reduce a block noise while retaining edge, to decrease predictive error in input picture signal between the present frame and the next frame, and to reduce transmission bit quantity.

According to a twenty-second aspect of the present invention, the picture encoding device of the twenty-first aspect includes means for dividing a picture into blocks and computing an inter-frame difference by block; means for determining whether the difference exceeds a certain threshold value; and means that only when the difference exceeds the threshold value, the corresponding block is processed by a filter having edge preserving property.

When there exists a picture block to which no additional difference component is added (i.e., a picture block signal that has been filtered and stored in the frame memory), by not making another filtering against the identical picture, a picture blur can be prevented.

According to a twenty-third aspect of the present invention, a picture encoding device in which a filter is attached to a decoding loop having a frame memory for storing a signal corresponding to one or a plurality of frames or fields, and an inter-frame encoding is performed by a corresponding pixel between an input signal and the frame memory, includes means for computing a motion vector; means for reading a picture value stored in the frame memory with consideration of the motion vector; and a filter having edge preserving property, which filter processes an output signal of the frame memory.

Therefore, the feature that an in-loop filter inside an encoding loop is constituted by the above filter, enables to decrease predictive error in input picture signal between the present frame and the next frame, and to reduce transmission bit quantity.

According to a twenty-fourth aspect of the present invention, a picture decoding device in which a filter is attached to a decoding loop having a frame memory for storing a signal corresponding to one or a plurality of frames or fields, and an inter-frame decoding is performed by a corresponding pixel between an input signal and the frame memory, is characterized in that a filter having edge preserving property is employed as the above filter, and a picture signal after being processed in a picture signal smoothing device is input, as a local decoding signal, to the frame memory storing the picture signal of the previous frame.

Therefore, the construction that a pixel value after the filtering is written to a decoded signal in the frame memory, allows to reduce a block noise while retaining edge, to decrease predictive error in input picture signal between the present frame and the next frame, and to reduce transmission bit quantity.

According to a twenty-fifth aspect of the present invention, the picture decoding device of the twenty-fourth aspect includes means for dividing a picture into blocks and computing an inter-frame difference by block; means for determining whether the difference exceeds a certain threshold value; and means that only when the difference exceeds the threshold value, the corresponding block is processed by a filter having edge preserving property.

In the case where there exists a picture block to which no additional difference component is added (i.e., a picture block signal that has been filtered and stored in the frame memory), by not performing another filtering against the identical picture, a picture blur can be prevented.

According to a twenty-sixth aspect of the present invention, a picture decoding device in which a filter is attached to a decoding loop having a frame memory for storing a signal corresponding to one or a plurality of frames or fields, and an inter-frame decoding is performed by a corresponding pixel between an input signal and the frame memory, includes means for computing a motion vector; means for reading a picture value stored in the frame memory with consideration of the motion vector; and a filter having edge preserving property, which filter processes an output signal of the frame memory.

Therefore, the feature that an in-loop filter inside an encoding loop is constituted by the above filter, enables to decrease predictive error in input picture signal between the present frame and the next frame, and to realize a picture signal decoding that reduces transmission bit quantity.

According to a twenty-seventh aspect of the present invention, a picture encoding method in which a filter is attached to a decoding loop having a frame memory for storing a signal corresponding to one or a plurality of frames or fields, and an inter-frame encoding is performed by a corresponding pixel between an input signal and the frame memory, includes the steps of performing a process using a filter having edge preserving property; and inputting a picture signal after being processed in a picture signal smoothing device to the frame memory storing a picture signal of the previous frame, as a local decoding signal.

Therefore, the feature that an in-loop filter inside an encoding loop is constituted by the above filter, enables to decrease a block noise while retaining edge, to decrease predictive error in input picture signal between the present frame and the next frame, and to reduce transmission bit quantity.

According to a twenty-eighth aspect of the present invention, the picture encoding method of the twenty-seventh aspect includes the step of dividing a picture into blocks and computing an inter-frame difference by block; the step of determining whether the difference exceeds a certain threshold value; and the step in which only when the difference exceeds the threshold value, such a block is processed by a filter having edge preserving property.

In the case where there exists a picture block to which no additional difference component is added (i.e., a picture block signal that has been filtered and stored in the frame memory), by not performing another filtering against the identical picture, a picture blur can be prevented.

According to a twenty-ninth aspect of the present invention, a picture encoding method in which a filter is attached to a decoding loop having a frame memory for storing a signal corresponding to one or a plurality of frames or fields, and an inter-frame encoding is performed by a corresponding pixel between an input signal and the frame memory, includes the steps of computing a motion vector; reading a picture value stored in a frame memory with consideration of a motion vector; and processing an output signal of the frame memory by using a filter having edge preserving property.

Therefore, the feature that an in-loop filter inside an encoding loop is constituted by the above filter, enables to decrease predictive error in input picture signal between the present frame and the next frame, and to reduce transmission bit quantity.

According to a thirtieth aspect of the present invention, a picture decoding method in which a filter is attached to a decoding loop having a frame memory for storing a signal corresponding to one or a plurality of frames or fields, and an inter-frame decoding is performed by a corresponding pixel between an input signal and the frame memory, includes the steps of performing a process using a filter having edge preserving property; and inputting a picture signal after being processed in a picture signal smoothing device to the frame memory storing the picture signal of the previous frame, as a decoded signal.

Therefore, the construction that a pixel value after the filtering is written to a decoded signal in the frame memory, allows to reduce a block noise while retaining edge, to decrease predictive error in input picture signal between the present frame and the next frame, and to reduce transmission bit quantity.

According to a thirty-first aspect of the present invention, the picture decoding method of the thirtieth aspect includes the step of dividing a picture into blocks and computing an inter-frame difference by block; the step of determining whether the difference exceeds a certain threshold value; and the step that only when the difference exceeds the threshold value, the corresponding block is processed by a filter having edge preserving property.

In the case where there exists a picture block to which no additional difference component is added (i.e., a picture block signal that has been filtered and stored in the frame memory), by not performing another filtering against the identical picture, a picture blur can be prevented.

According to a thirty-second aspect of the present invention, a picture decoding method in which a filter is attached to a decoding loop having a frame memory for storing a signal corresponding to one or a plurality of frames or fields, and an inter-frame decoding is performed by a corresponding pixel between an input signal and the frame memory, includes the steps of computing a motion vector; reading a picture value stored in the frame memory with consideration of the motion vector; and processing an output signal of the frame memory by using a filter having edge preserving property.

Therefore, the features that an in-loop filter inside an encoding loop is constituted by the above filter, enables to decrease predictive error in input picture signal between the present frame and the next frame, and to reduce transmission bit quantity.

DETAILED DESCRIPTION OF THE PREFERRED EMBODIMENT

A description will be given of embodiments of the present invention, referring to FIG. 1 through FIG. 20.

[Embodiment 1]

In order to reduce deterioration of a decoded picture and suppress a decrease of resolution of the entire picture, the embodiment 1 of the present invention has a constitution in which after adding a non-negative value to a difference value between a decoded target pixel and its surrounding pixel, an inverse number is taken and, there is employed a smoothing filter that utilizes such an inverse number as a weight and has edge preserving property. In this smoothing filter, a smoothing is performed by the inverse number of a difference value, and therefore, if a target pixel is an isolated point, the difference between the target pixel and every surrounding pixel is great and all surrounding pixels have a similar weight. If there is an edge adjacent to a target pixel, a difference between the target pixel and the edge is great, but the difference between the target pixel and the surrounding pixel except the edge is small. This leads to a constitution in which a weighted mean is taken so that the weight of the edge side is small. A continuous edge can be preserved by this constitution, and the isolated point can be smoothed. By controlling a non-negative value that is added prior to taking the inverse number in computing a weighting factor, it is possible to erase noise of not more than a certain value, as well as quantizing error. Further, the use of the above smoothing filter enables to greatly reduce distortion occurred on block boundaries, leading to much visual improvement of picture quality. Furthermore, since in the smoothing process, characteristics of the smoothing filter is changed according to the roughness of a decoded parameter and the activity of a picture signal, it is possible to suppress deterioration of resolution of the entire decoded picture, to obtain a decoding picture that is visually legible and has high quality.

Figure 1:
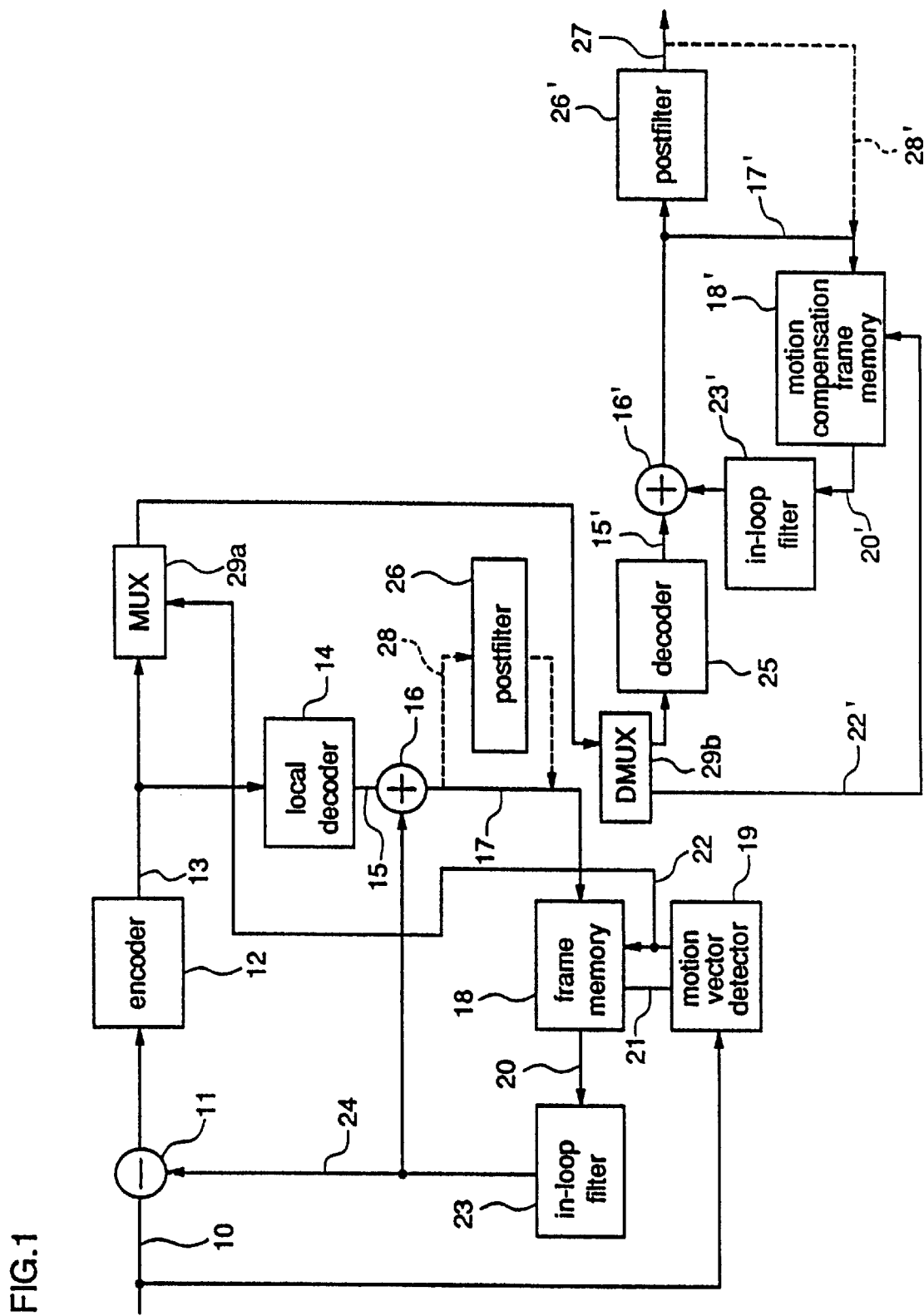
FIG. 1 is a block diagram illustrating an inter-frame encoding system to which the present invention is applied.

FIG. 1 is a block diagram of a picture encoding and decoding device in the present invention. There are indicated the positions of an in-loop filter 23 and a postfilter 26, in addition to the constitution as previously described in the prior art.

Figure 2:
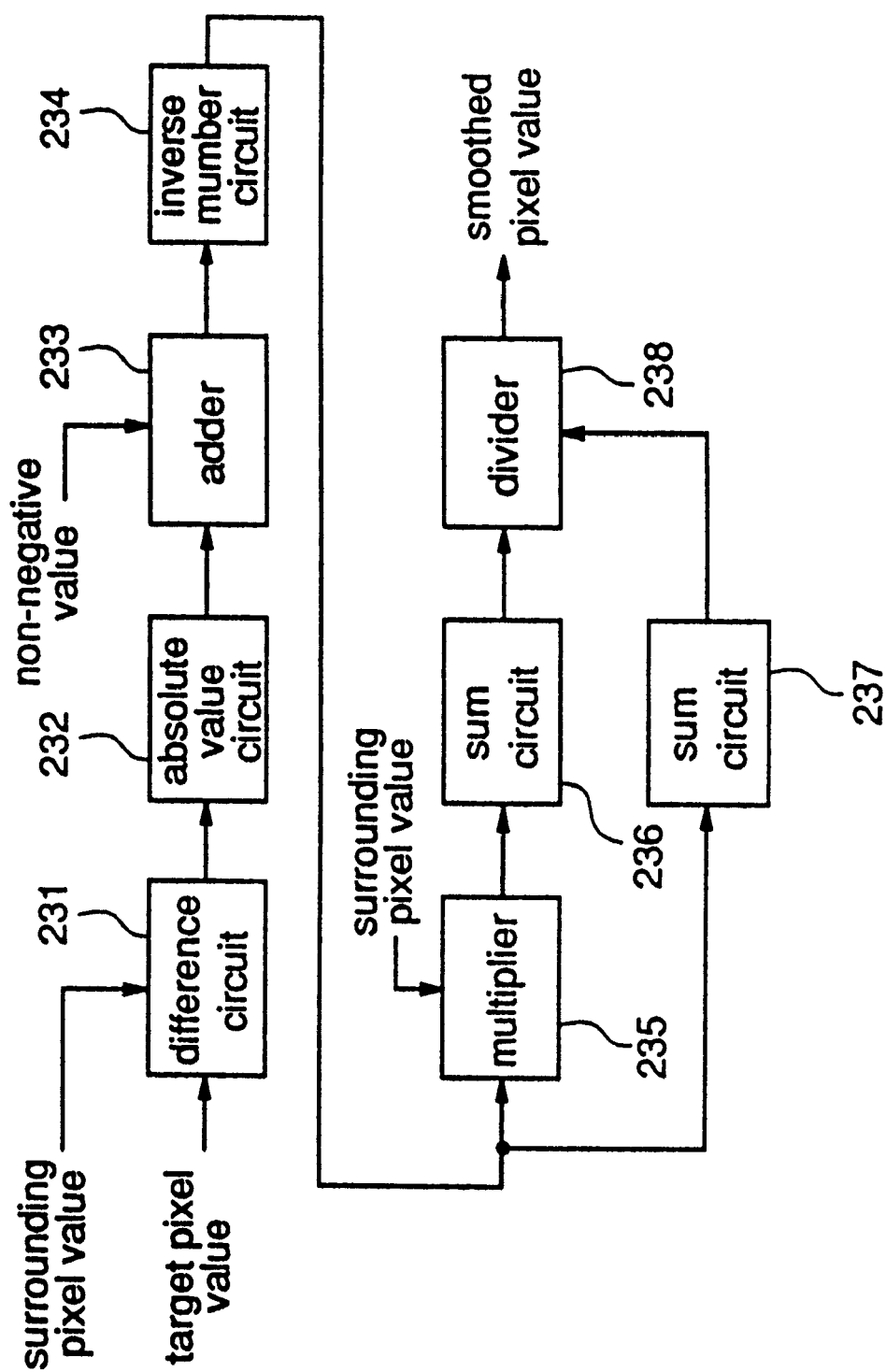
FIG. 2 is a block diagram illustrating a constitution of a smoothing filter of the present invention.

FIG. 2 shows a constitution of a block of a smoothing filter that is installed in the in-loop filter 23 or the postfilter 26 in FIG. 1. A difference circuit 231 detects a difference between a target pixel value and its surrounding pixel value, and an absolute value circuit 232 takes the absolute value that represents a magnitude of the detected difference. The absolute value is added to a non-negative value m in an adder 233, and the inverse number of a resultant value thus added is taken in an inverse number circuit 234, to obtain a weighting factor. The weighting factor is multiplied by the surrounding pixel value in a multiplier 235. A sum circuit 236 takes the sum of the multiplied values. A sum circuit 237 takes the sum of the weighting factors. The sum taken in the sum circuit 236 is divided by the sum taken by the sum circuit 237, to obtain a smoothed pixel value.

Figure 3:
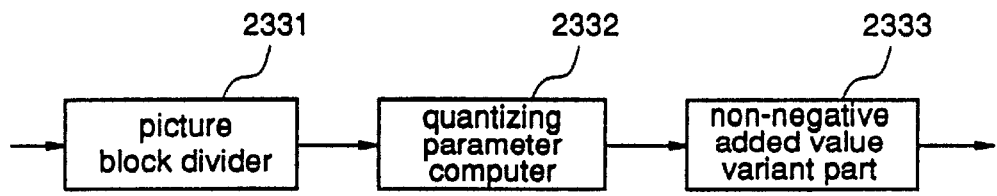
FIG. 3 is a block diagram of a further constitution that is added to the smoothing filter of FIG. 2.

FIG. 3 shows a constitution added to the smoothing filter in FIG. 2. A picture block divider 2331 divides a picture to be filtered into blocks. A quantizing parameter for each picture of a block thus divided is computed in a quantizing parameter computer 2332. According to roughness of the quantizing parameter, a non-negative added value variant part 2333 changes a non-negative value m to be added in the adder 233.

Figure 4:
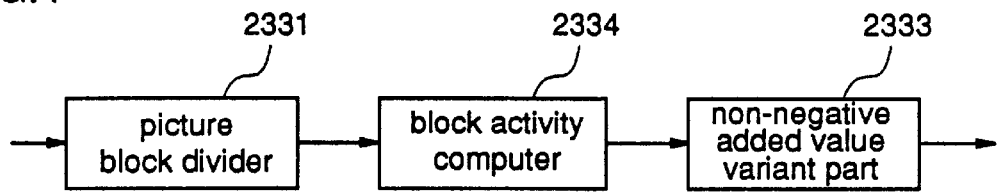
FIG. 4 is a block diagram of a further constitution that is added to the smoothing filter of FIG. 2.

FIG. 4 shows a further constitution to be added to the smoothing filter in FIG. 2. A block activity computer 2334 computes an activity of each picture in a divided block. According to the block activity, the non-negative added value variant part 2333 changes a non-negative value m to be added in the adder 233 in FIG. 2.

Figure 5:
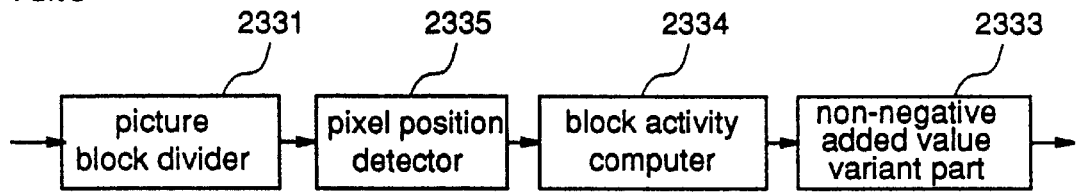
FIG. 5 is a block diagram of a further constitution that is added to the smoothing filter of FIG. 2.

FIG. 5 shows a further constitution to be added to the smoothing filter in FIG. 2. A pixel position detector 2335 detects whether a target pixel exists on a block boundary. If the target pixel exists on the block boundary, the block activity computer 2334 detects the activity of a block adjacent to the target pixel, and the non-negative added value variant part 2333 changes a non-negative value m to be added in the adder 233 in FIG. 2.

Figure 6:
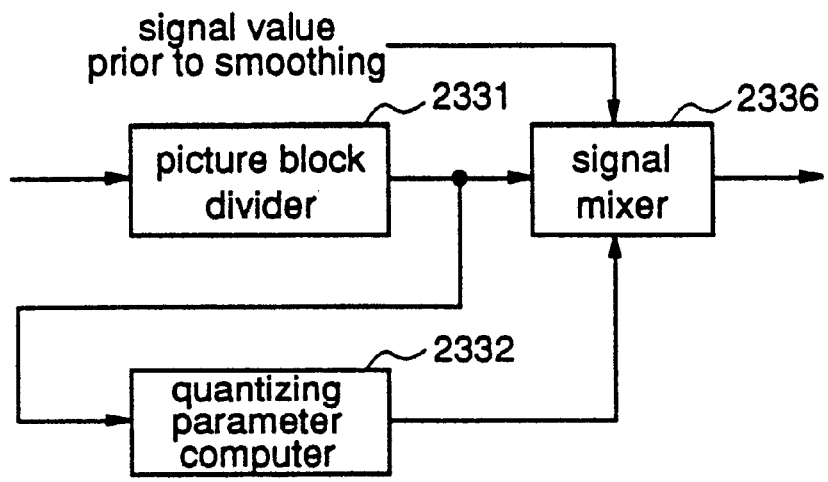
FIG. 6 is a block diagram of a further constitution that is added to the smoothing filter of FIG. 2.

FIG. 6 shows a further constitution to be added to the smoothing filter in FIG. 2. The quantizing parameter computer 2332 computes a quantizing parameter of each block in a picture signal. According to roughness of the respective quantizing parameter, a signal mixer 2336 appropriately changes the mixing ratio of a signal value after being smoothed by block in a picture signal, and a signal value before being smoothed.

Figure 7:
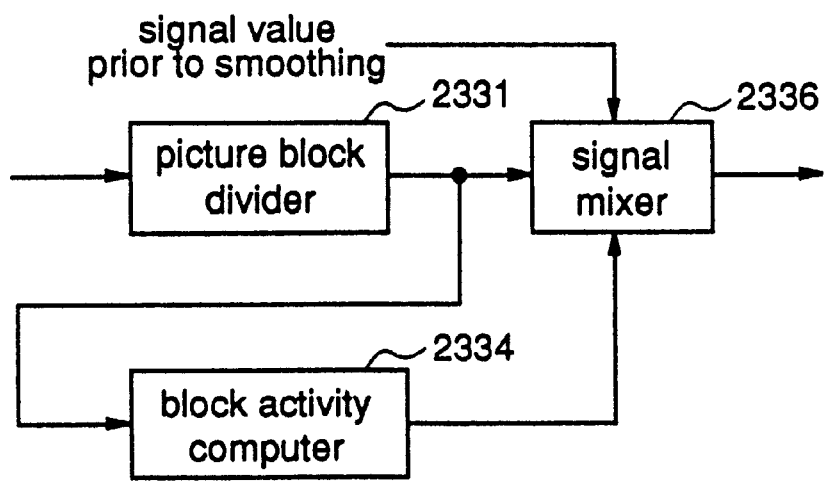
FIG. 7 is a block diagram of a further constitution that is added to the smoothing filter of FIG. 2.

FIG. 7 shows a further constitution to be added to the smoothing filter in FIG. 2. The block activity computer 2334 computes the activity of each block in a picture signal. According to the respective activity, the signal mixer 2336 appropriately changes the mixing ratio of a signal value after being smoothed by block in a picture signal, and a signal value before being smoothed.

Figure 8:
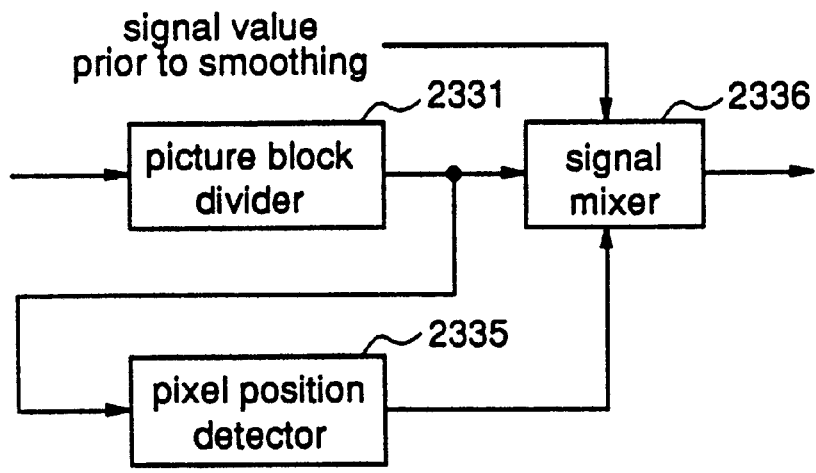
FIG. 8 is a block diagram of a further constitution that is added to the smoothing filter of FIG. 2.

FIG. 8 shows a further constitution to be added to the smoothing filter in FIG. 2. The pixel position detector 2335 detects whether a target pixel exists on a block boundary. If the target pixel is in such a position that it contacts with the block boundary, the signal mixer 2336 appropriately changes the mixing ratio of a signal value after being smoothed by block in a picture signal, and a signal value before being smoothed.

Figure 9:
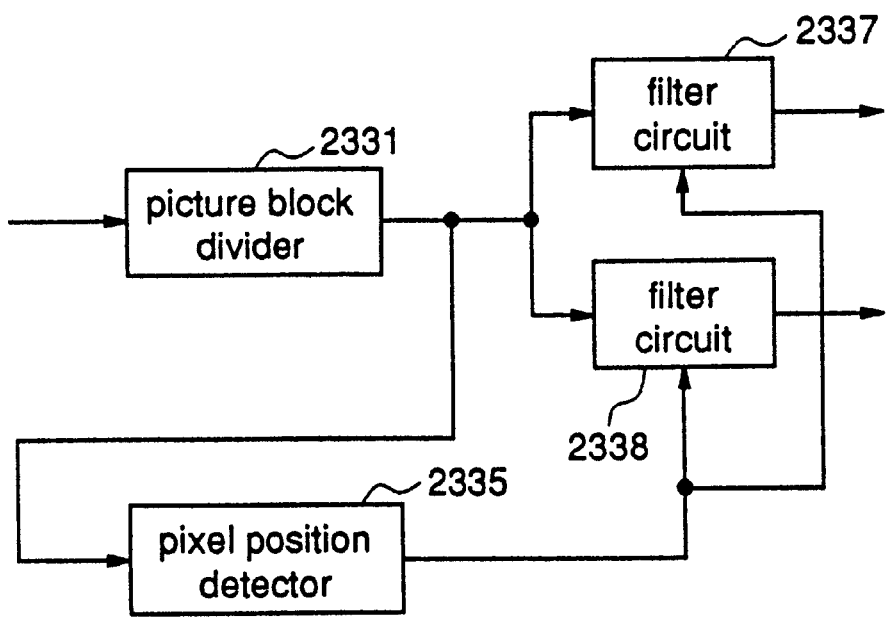
FIG. 9 is a block diagram of a constitution of the smoothing filter of the present invention.

FIG. 9 shows a constitution of the smoothing filter in FIG. 2. The pixel position detector 2335 detects whether a target pixel exists on a block boundary. If the target pixel exists on the block boundary, there is selected a filter circuit 2337 that performs a smooth filtering whose edge preserving property is weakened. If the target pixel exists inside a block, there is selected a filter circuit 2338 that performs a smooth filtering having edge preserving property.

Figure 10:
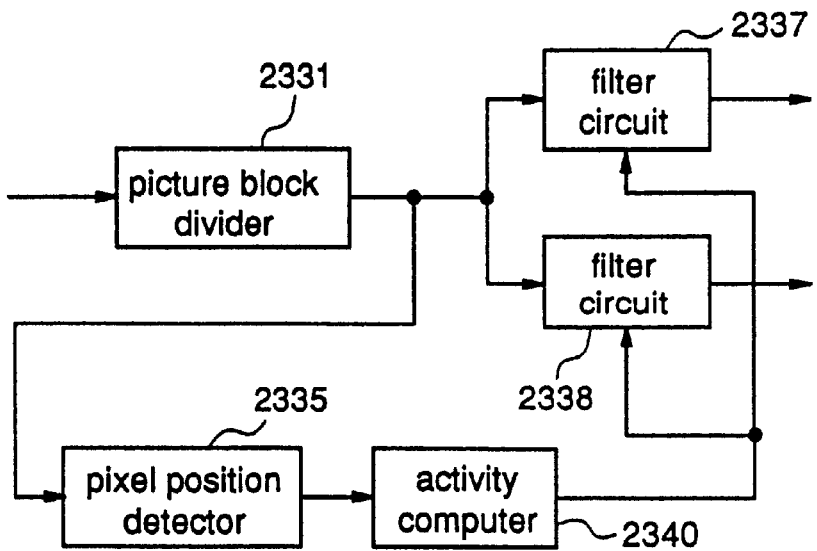
FIG. 10 is a block diagram of a further constitution of the smoothing filter of the present invention.

FIG. 10 shows a further constitution of the smoothing filter in FIG. 2. The pixel position detector 2335 detects whether a target pixel exists on a block boundary. If the target pixel exists on the block boundary, the activity computer 2340 computes the activity of the target pixel from the target pixel value and its surrounding pixel value. According to the activity, the filter circuit 2337 that performs a smooth filtering whose edge preserving property is weakened, or the filter circuit 2338 that performs a smooth filtering having edge preserving property is selected.

Figure 11:
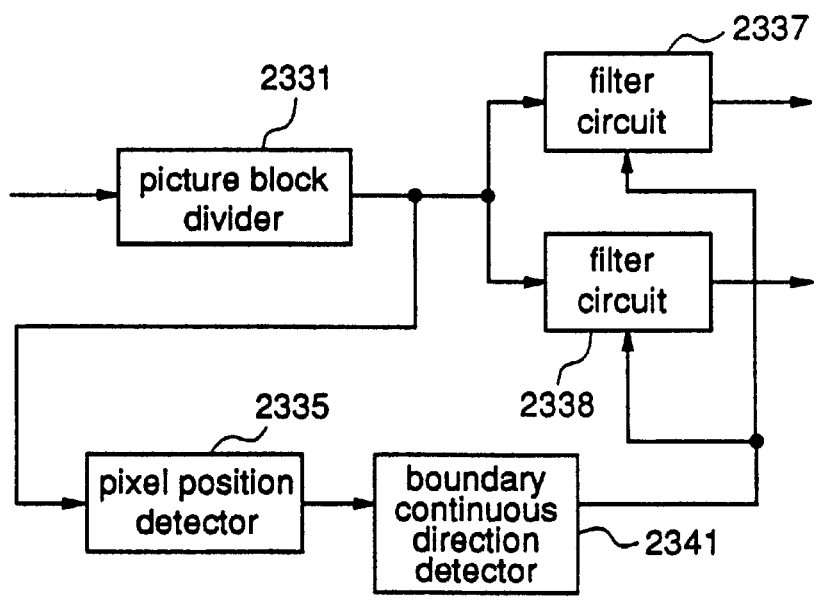
FIG. 11 is a block diagram of a further constitution of the smoothing filter of the present invention.

FIG. 11 shows a further constitution of the smoothing filter in FIG. 2. The pixel position detector 2335 detects whether a target pixel exists on a block boundary. If the target pixel exists on the block boundary, a boundary continuous direction detector 2341 detects whether the block boundary to which the target pixel belongs continues horizontally or vertically. According the direction of the block to which the target pixel belongs, the filter circuit 2337 that performs a smooth filtering whose edge preserving property is weakened, or the filter circuit 2338 that performs a smooth filtering having edge preserving property is selected.

Figure 12:
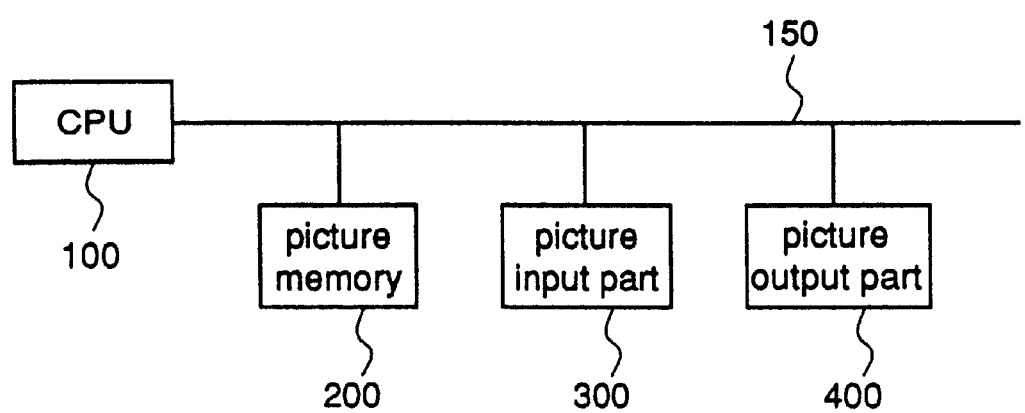
FIG. 12 is a block diagram of a further constitution of the smoothing filter of the present invention.
Figure 13:
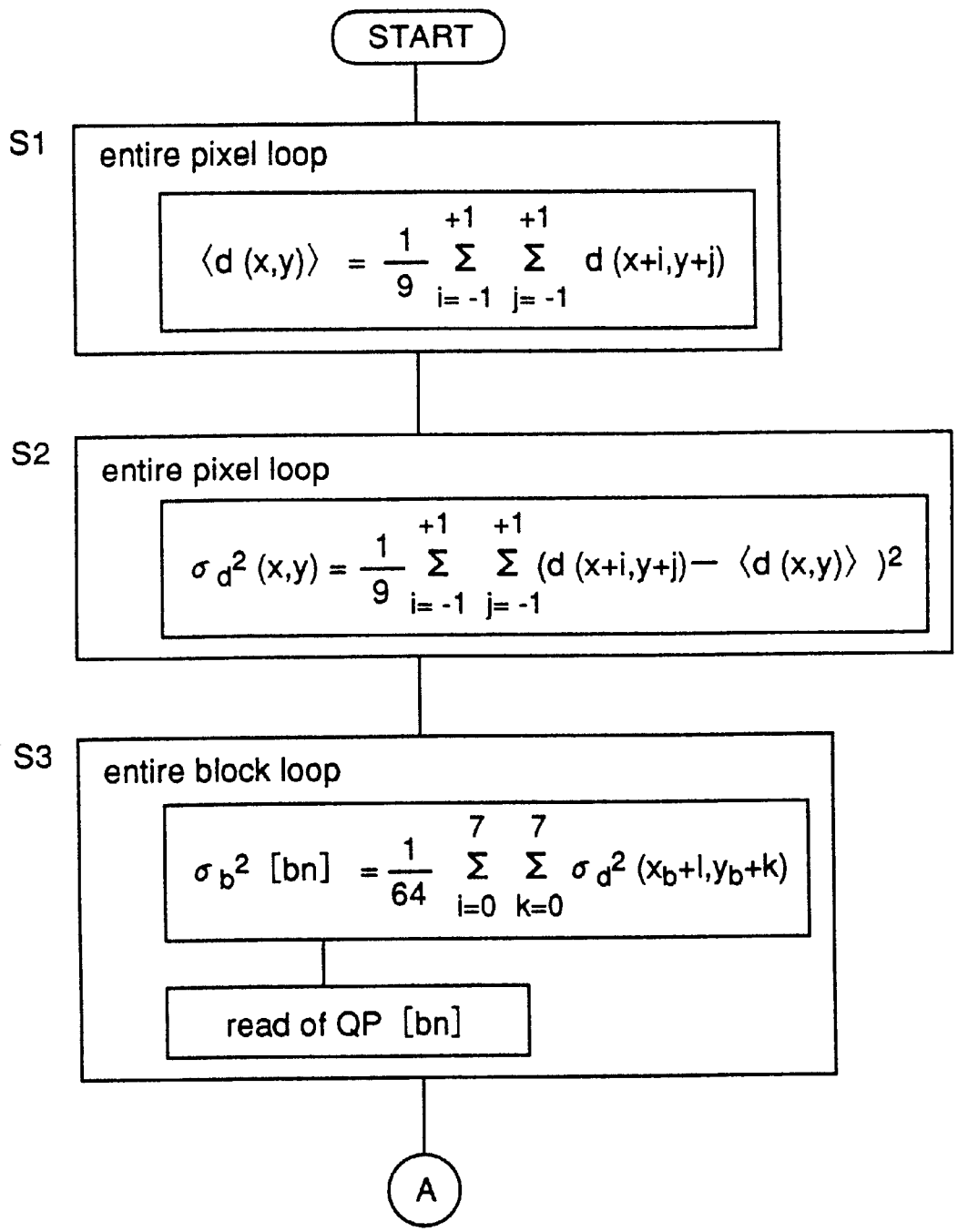
FIG. 13 is a detail flow chart of a filter controlling of the present invention.
Figure 14:
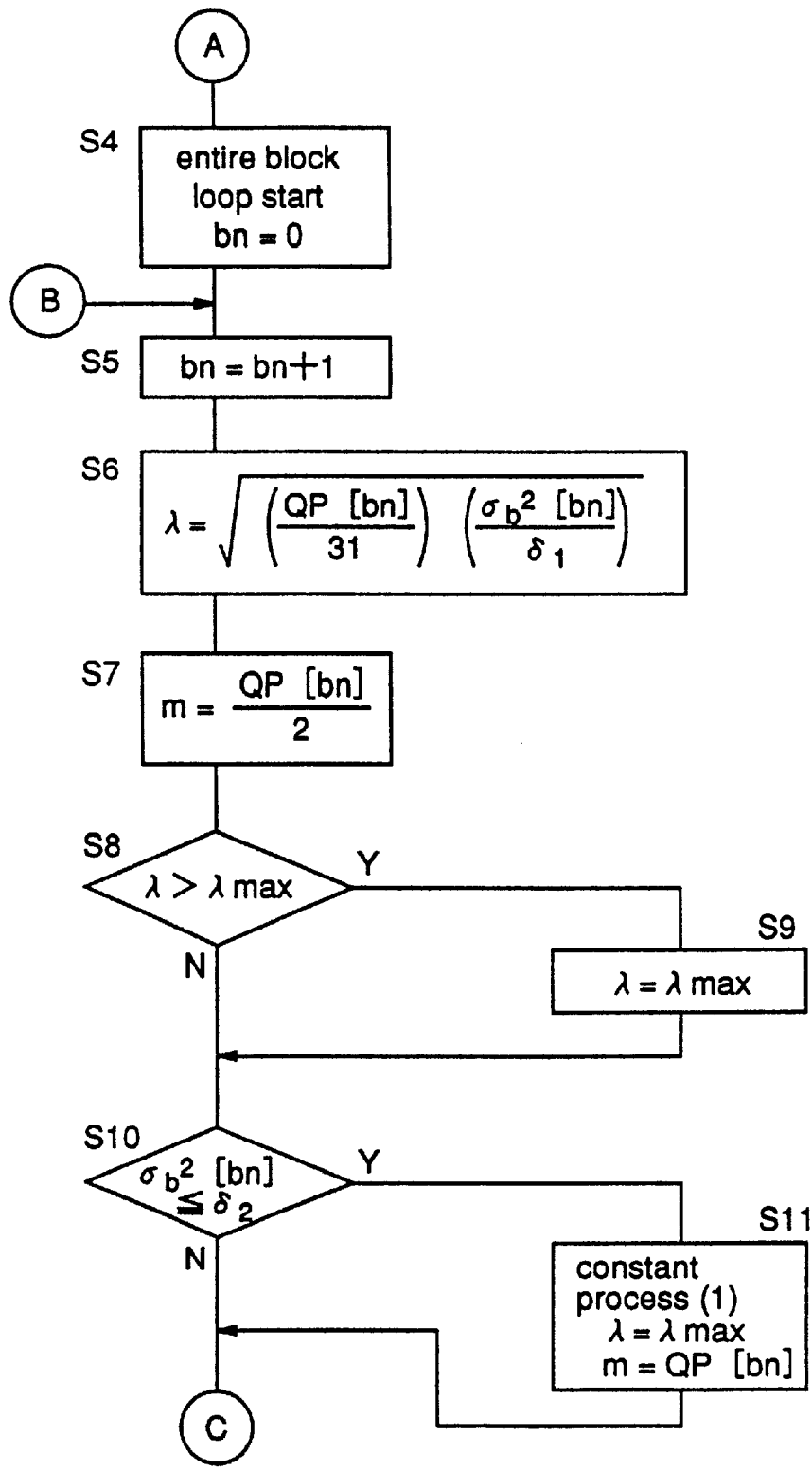
FIG. 14 is a detail flow chart of a further filter controlling of the present invention.
Figure 15:
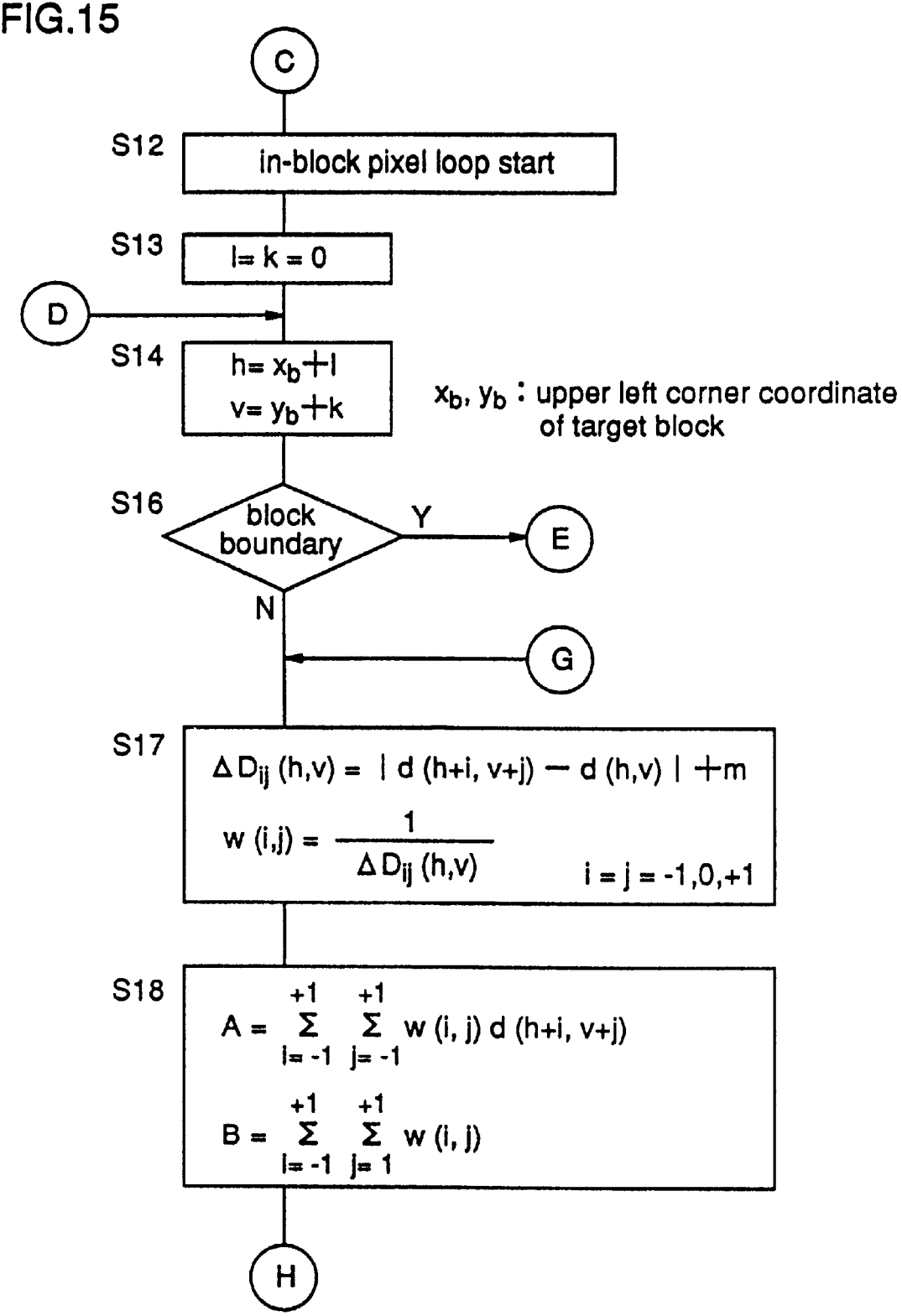
FIG. 15 is a detail flow chart of a further filter controlling of the present invention.
Figure 16:
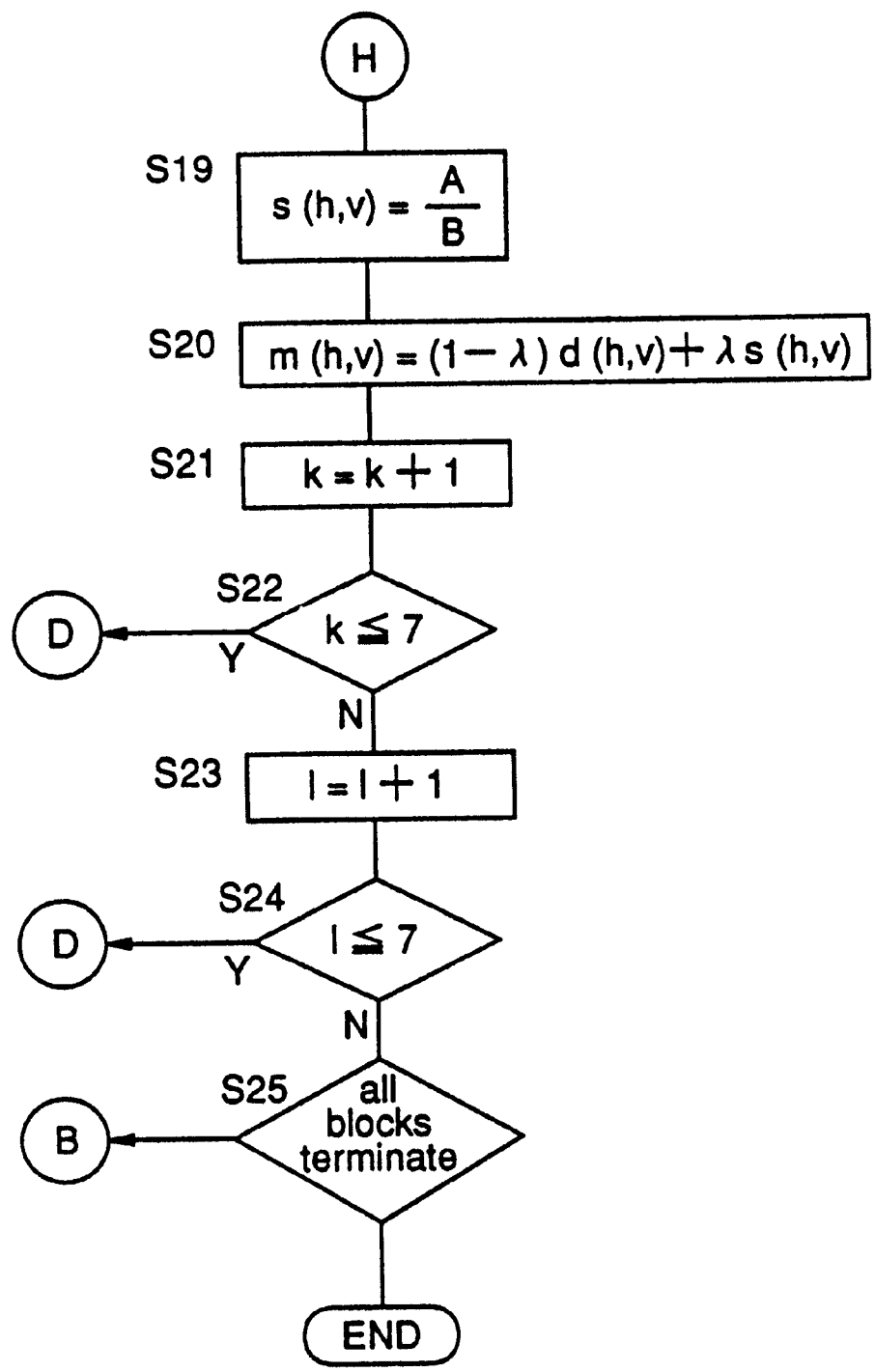
FIG. 16 is a detail flow chart of a further filter controlling of the present invention.
Figure 17:
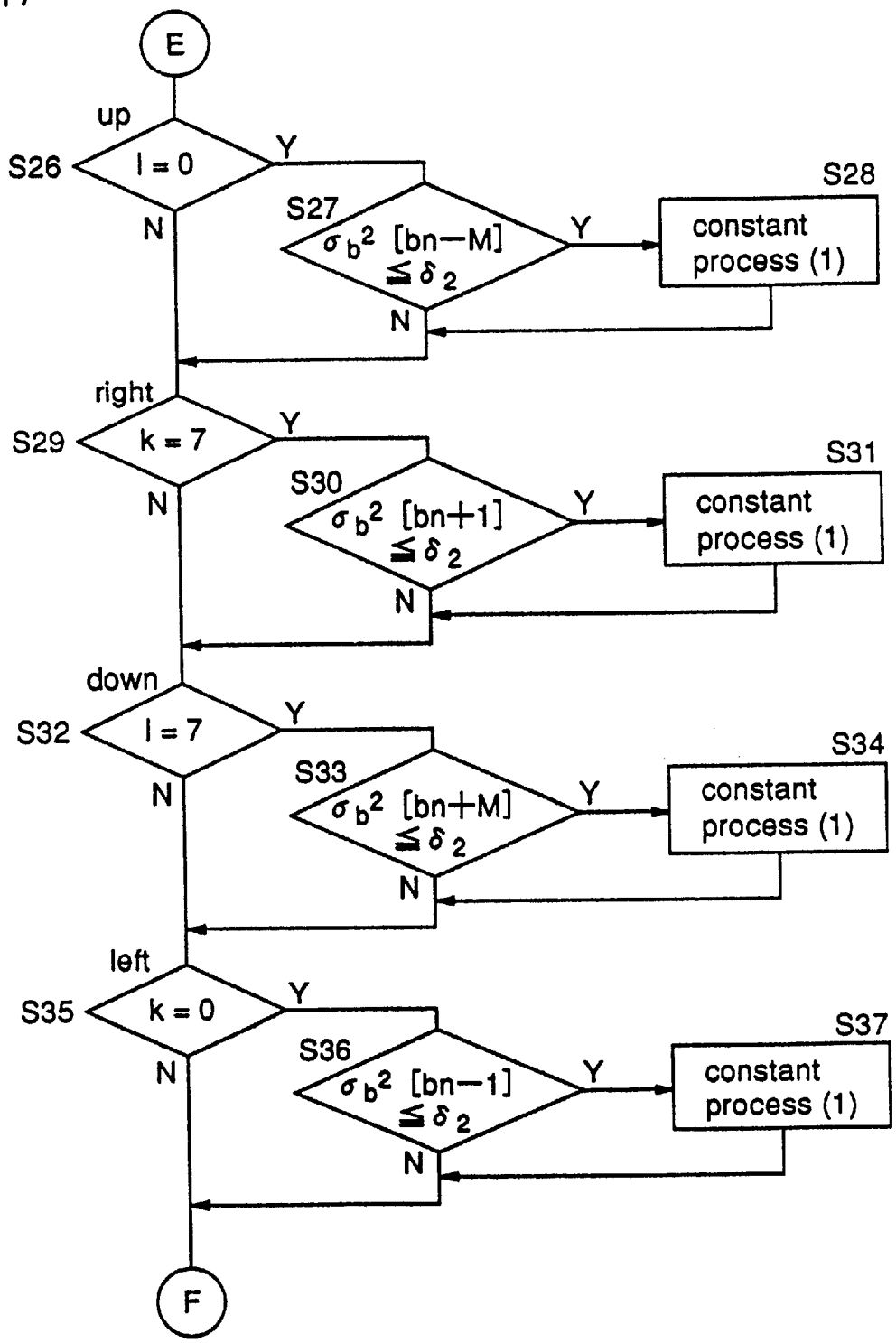
FIG. 17 is a detail flow chart of a further filter controlling of the present invention.
Figure 18:
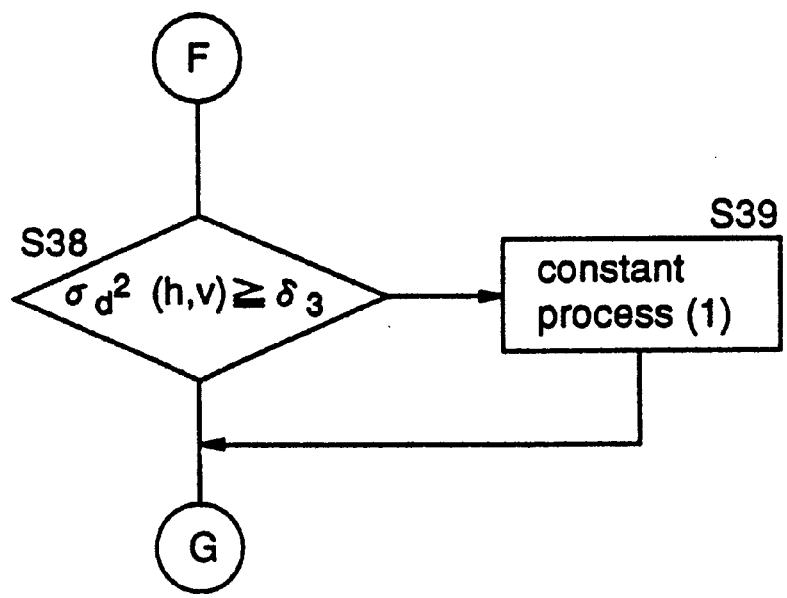
FIG. 18 is a detail flow chart of a further filter controlling of the present invention.

FIG. 12 shows a constitution in which the picture encoding and decoding device in FIG. 1 or the smoothing filter in FIG. 2 through FIG. 11 is realized by software. A picture input part 300 inputs a picture data. The input picture data is input directly to a CPU 100 via a bus 150, alternatively, after the input picture data is stored in a picture memory 200, it is read from the picture memory 200 and input to the CPU 100. The picture data input to the CPU 100 is processed by software and input directly to a picture output part 400 via the bus 150, alternatively, after the input picture data is stored in the picture memory 200, it is read from the picture memory 200 and input to the picture output part 400.

In order to clarify the definition of the technique of the embodiment 1 of the present invention, similar equations as defined in the description of the prior art will be defined here.

Figure 20:
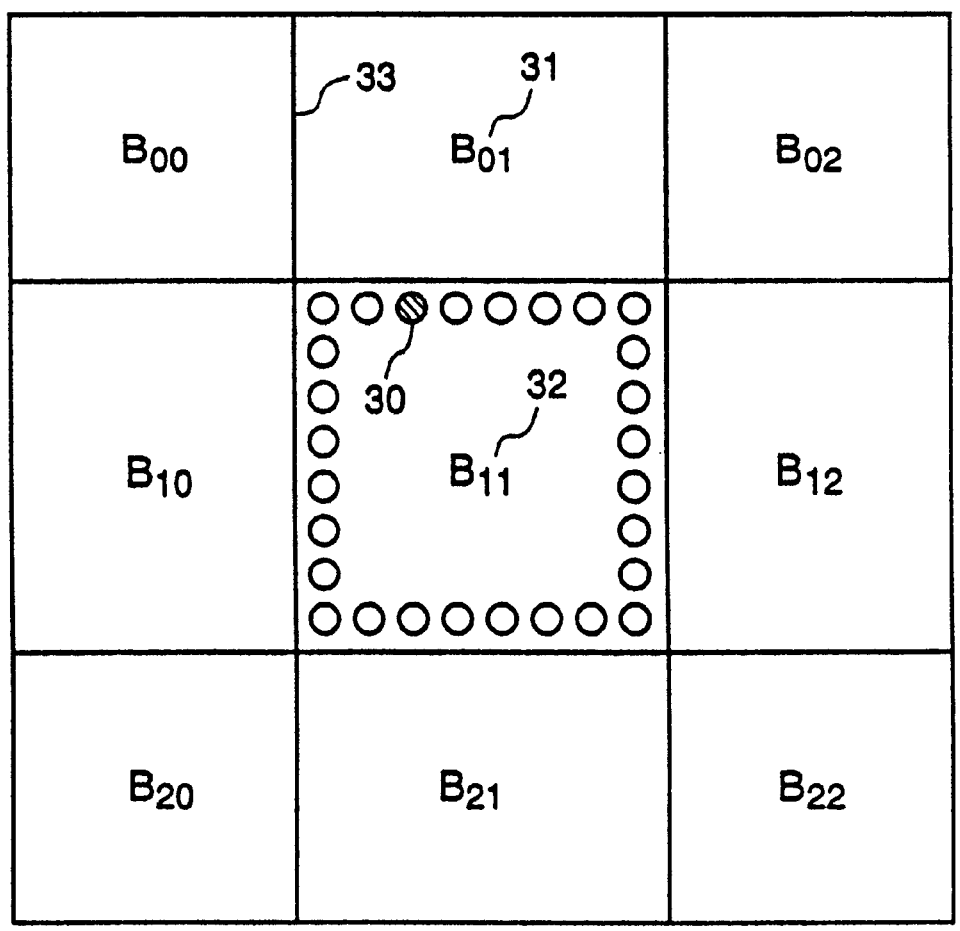
FIG. 20 is a diagram illustrating block dividing and adjacent blocks adjacent to a target pixel.
Figure 21:
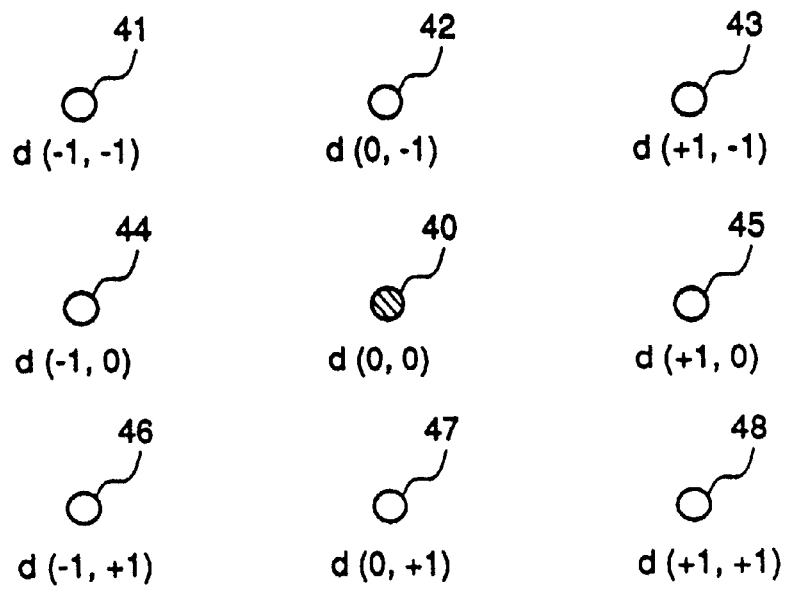
FIG. 21 is a diagram illustrating local regions of the equations (1), (2) and (7).
Figure 22:
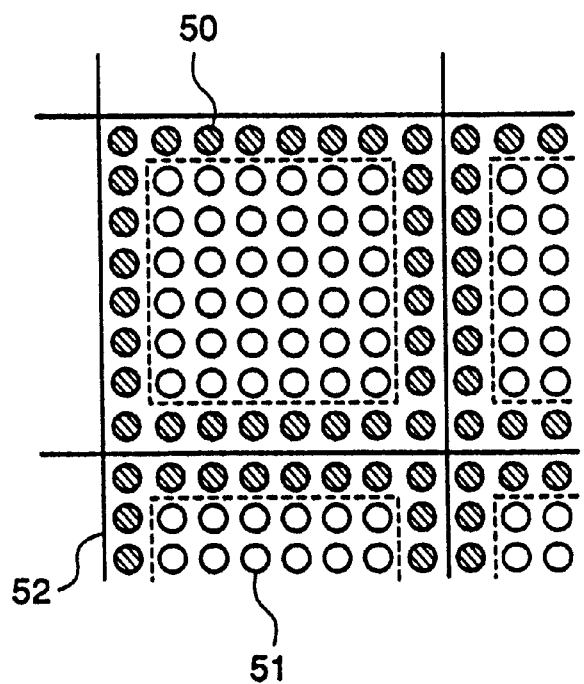
FIG. 22 is a diagram explaining one example of IE84-46 in the TECHNICAL REPORT OF IEICE.
Figure 23:
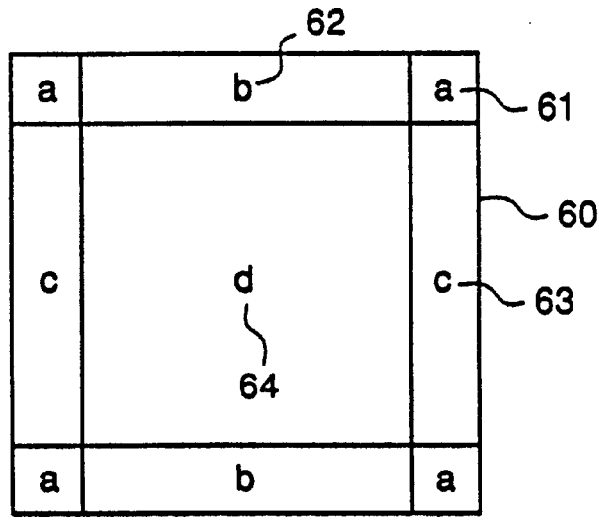
FIG. 23 is a diagram explaining filter coefficients of the H. 261 standard.
Figure 23:
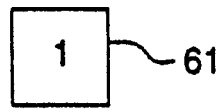
Figure 23:
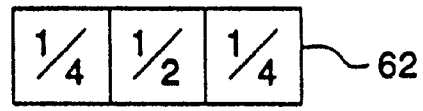
Figure 23:
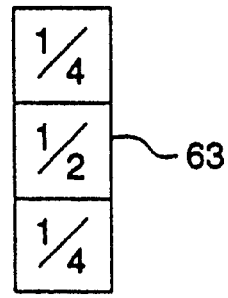
Figure 23:
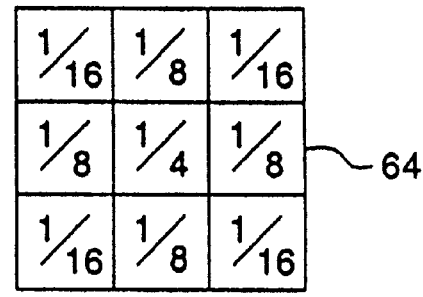
Figure 24:
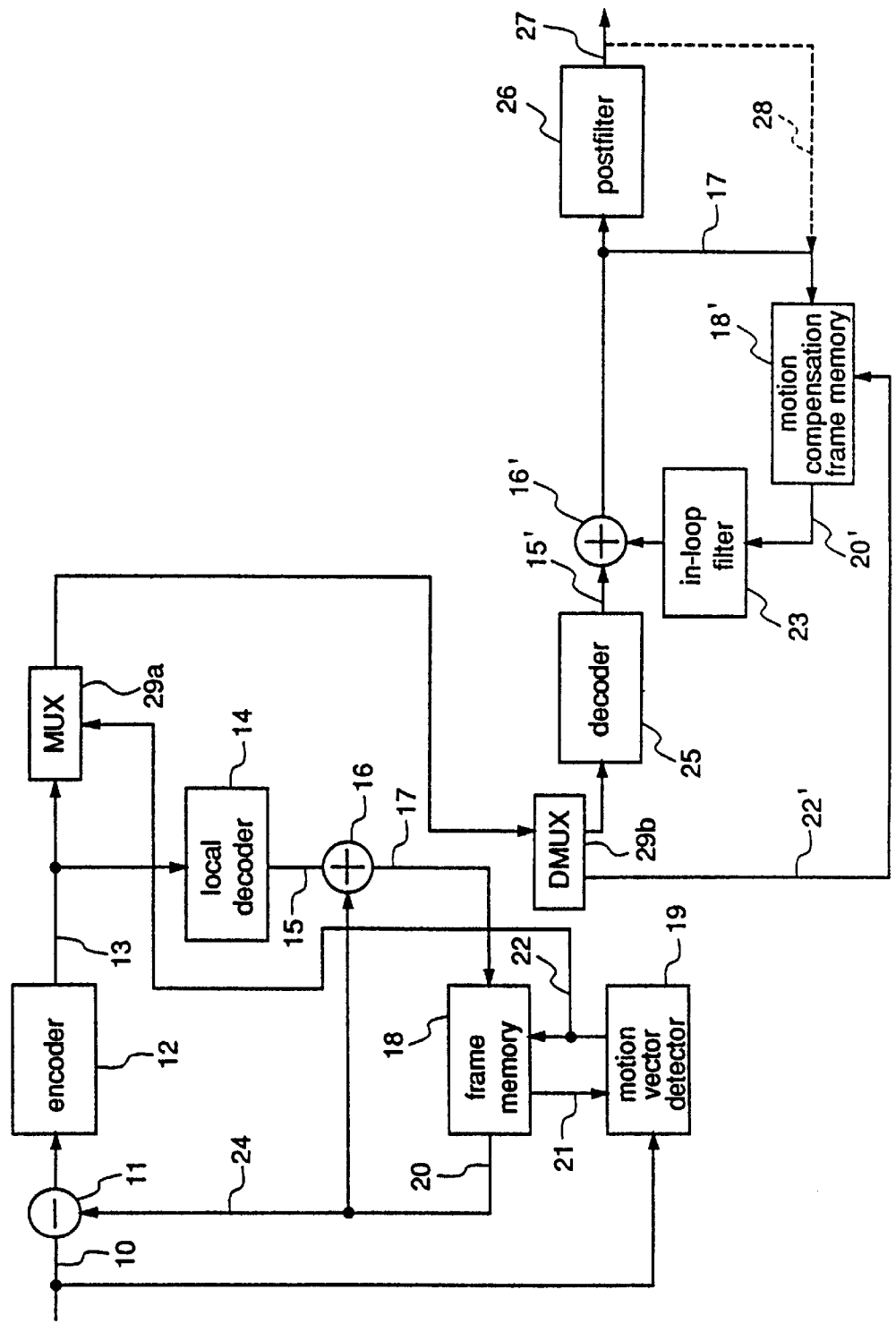
FIG. 24 is a block diagram of an inter-frame encoding system to which a prior art filtering system is applied.

Assuming that a local region of the surrounding of a target pixel (hereinafter referred to as "local region") is a picture region of 3×3 pixels as shown in FIG. 21, and that a region in which $\sigma_b^2$ (block activity) is computed is a region (hereinafter referred to as "picture block") of 8×8 pixels in which DCT operation as shown in FIG. 20 is performed, a quantizing parameter in decoding is stored by picture block.

Against each of the entire pixels of a decoded picture, a local average value <d(x, y)> is defined in a local region as shown in FIG. 21, based on the equation (12).

In taking the sum Σ of the local average values, if the value is outside of the range of the picture region depending on the values of i and j, the value of the target pixel is employed. Note that d(x, y) is a decoded pixel value of the coordinate (x, y).

$$\langle d(x, y)\rangle = \frac{1}{9}\sum_{i=-1}^{+1}\sum_{j=-1}^{+1} d(x+i, y+j) \quad (12)$$

Then, a dispersion of each pixel (hereinafter referred to as "local activity"), as defined by the equation (13), is obtained in the local region. Here, the sum of the square of the difference between the local region and the local average of the equation (12) is obtained as the definition of the dispersion. This definition is given to every pixel as in the equation (12).

$$\sigma_d^2(x, y) = \frac{1}{9}\sum_{i=-1}^{+1}\sum_{j=-1}^{+1} (d(x+i, y+j) - \langle d(x, y)\rangle)^2 \quad (13)$$

Picture block dispersion (hereinafter referred to as "block activity") is defined by the equation (14). The block activity is defined by block, as shown in FIG. 20.

$$\sigma_b^2[bn] = \frac{1}{64} \sum_{t=0}^{+7} \sum_{k=0}^{+7} \sigma_d^2(x_b + k, y_b + 1) \quad (14)$$

wherein $x_b$, $y_b$ are values of the upper left corner coordinate that belongs to the picture block number $b_n$.

An m(x, y), d(x, y) and s(x, y) are respectively a corrected pixel value, a decoded pixel value and a pixel value that has been smoothed by local region.

$$m(x, y)=(1-\lambda) \ d(x, y)+\lambda s(x, y) \quad (15)$$

Here, $\lambda$ is a mixing ratio of a decoded value and a value smoothed by local region. The mixing ratio is defined by the following equations (16) to (18), wherein QP is a quantizing parameter in decoding, $\sigma_b^2$ is a block activity computed by the equation (14) and $\delta$, is a constant that is experimentally determined to change filtering characteristics within the range of equation (17) depending on each pixel character.

If the quantizing parameter is great, quantizing error is liable to occur. If the block activity of a decoded picture is great, many steps of a pixel value present. For this, it is so constituted that the smoothing characteristics is enhanced.

Thus it is possible to change filtering characteristics by picture block, depending on each pixel character. Additionally, when the quantizing parameter is 1, no quantizing error occurs, so that the value after the final filtering can be held at a signal prior to the smoothing process. As a result, the constitution in which the mixing ratio is controlled by quantizing parameter, enables to prevent a smoothed signal value from being utilized in the filtering, allowing to skip the filtering process. Therefore, when the device is constituted by CPU or DSP, its processing time can be reduced.

In a flat block having low block activity, by making the final filtering value contain smoothed and flat signals as much as possible, it is possible to erase noise being noticeable in a flat block.

$$\lambda = \sqrt{\left(\frac{QP[bn]}{31} \times \frac{\sigma_b^2[bn]}{\delta_1}\right)} \quad (16)$$

A decoded value d(x, y) in the coordinate (x, y) is not included in the smoothing of the second term s(x, y) in the right side as defined in the equation (15). From the definitions of the equations (18) and (21), the pixel value of a target position d(x, y) is not included in the pixel value s(x, y) after the smoothing. Therefore, the range of the value $\lambda$ is as set below.

$$0 \leq \lambda \leq \lambda_{max} \quad (17)$$

When $\lambda$ of the equation (16) results in underflow with a value in the range of the equation (17), it is fixed at the minimum value. In overflow, it is fixed at the maximum value.

Next defined is a pixel value computing of a smoothing of the second term in the right side as employed in the equation (15).

The smoothing is to take a weighted mean of a surrounding pixel according to a weight as defined in the equation (21). Since the weight is defined by the inverse number of a difference between pixel values, a place such as an edge in which the difference between pixel values is great, has no influence on the smoothing. That is, the smoothing is so performed that edge is preserved.

$$s(x, y) = \frac{\sum_{i=-1}^{+1} \sum_{j=-1}^{+1} w(i, j) d(x+i, y+j)}{\sum_{i=-1}^{+1} \sum_{j=-1}^{+1} w(i, j)} \quad (18)$$

A difference from a surrounding pixel of the coordinate (x, y) is taken by local region and, for normalization, a non-negative number m is added to the absolute value that represents a magnitude of the difference from each pixel. By the action of this term, even if d(x, y)−d(x+i, y+j)=0, there is no possibility that the equation (21) becomes infinity.

Further, when the difference value from the surrounding pixel is m or less, by the action of this term, a value near a simple average of the surrounding pixels is to be computed.

Thus, since the smoothing is performed by the inverse number of the difference value as previously described, a continuous edge can be preserved by this constitution, and an isolation point can be smoothed. Furthermore, by adding a non-negative value, it is possible that the operation result after taking the inverse number will be infinity.

$$\Delta D_{ij}(x, y)=f(d(x+i, y+j)−d(x, y))+m \quad (19)$$

where f( ) is a function monotonically increasing, according to $|d(x+i, y+j)−d(x,y)|$.

If the value m of the second term in the right side is great, there functions to mask a pixel value difference (the first term in the right side) being the edge preserving effect. Although the mask value may be replaced with a fixed value, in order that the change of quantizing error is reflected, it is controlled by the quantizing parameter as indicated in the equation (20). This enables to erase noise that enlarges with enlarging the quantizing error.

$$m = \frac{QP[bn]}{2} \quad (20)$$

$$w(i, j) = \frac{1}{\Delta D_{ij}(x, y)} \quad (i, j = -1, 0, +1; \text{ and } w(0, 0) = 0) \quad (21)$$

When block distortion occurs, the local activity $\delta_b^2$ is 0, inside a block. A pixel on a block boundary has a great local activity because a surrounding pixel touches an adjacent block to cause a step. In such circumstances, however, since an average is taken by block, the block activity $\delta_b^2$ is below a certain threshold value $\delta_2$. In order to strongly erase a block distortion, an additional limiting item is set to $\lambda$ being computed by the equations (16) and (17). This enables to enlarge a noise recognizable width and enhance flat smoothing characteristics, thereby preventing noise from being recognized.

$$\text{When } \sigma_b^2[bn] \leq \delta_2, \ m=QP[bn], \ \lambda=\lambda_{max} \quad (22)$$

If a target pixel exists on a block boundary and is under the following conditions of (i) and (ii), the smoothing characteristic is enhanced. These conditions lead to such a filtering that the edge preserving property is strong inside a block and is weak on a block boundary.

Therefore, if a picture is adjacent to a flat block, it is detected that such an adjacent block is flat and has low block activity, so that the flatness of the smoothing characteristics of a point at which the flat block touches, is increased to blur a predictable boundary step.

If a picture is adjacent to a flat block having low block activity, it is detected that such an adjacent block is flat, so that the flatness of the smoothing characteristics of a point at which the flat block touches, is increased to blur a predictable boundary step.

If a target point exists on a block boundary and has high activity, the flatness of the smoothing characteristics and the proportion of the smoothing characteristics in filtering characteristics are increased to erase a predictable step.

$$m=QP[bn], \lambda=\lambda_{max} \quad (23)$$

(i) In the case where a block activity of a block adjacent to a picture block to which a target pixel touches is lower than a certain threshold value $\delta_2$.

In the equation (22), only an activity of a block to which a target pixel belongs is determined. The conditions (i) determines an activity of an adjacent block. In FIG. 20, provided that the number 30 is a target pixel, the number 31 is an adjacent block.

(ii) In the case where a local activity of a target pixel is higher than a certain threshold value $\delta_3$. This corresponds to the case where a waveform that is composed of a frequency component having a high rectangular conversion (DCT conversion), is cut on a block boundary, ard a step occurs between the waveform and an adjacent block.

Each example of the threshold values $\lambda_{max}$, $\delta_1$, $\delta_2$ and $\delta_3$ is as below.

$$\lambda_{max} = 0.75 \quad (24)$$

$$\delta_1 = \frac{\sigma_{pic}}{25} \times \sigma_{pic} \quad (25)$$

$$\delta_2 = 75 \text{ for a brightness}(Y) \quad (26)$$
$$\delta_2 = 30 \text{ for a hue }(U, V)$$

$$\delta_3 = 35 \times \delta_{pic} \quad (27)$$

$$\sigma_{pic} = \frac{1}{M \times N} \sum_M \sum_N \sigma_b^2[bn] \quad (28)$$

wherein $\sigma_{pic}$ is a mean of block activities in the entire picture; M is the block number in the horizontal direction; and N is the block number in the vertical direction.

When a picture is divided into blocks of 8×8, x of the coordinate (x, y) is a multiple of 8, or a surplus of the multiple of 8 is 7, there exists a block boundary that continues in the vertical direction.

Similarly, when y is a multiple of 8, or a surplus of the multiple of 8 is 7, there exists a block boundary that continues in the horizontal direction.

(iii) In the case where a target pixel belongs to a block boundary, and its local activity is higher than $\delta_3$ Since it is determined that a block noise occurs on a block boundary, the above equations (19) and (20) should be newly defined as follows:

$$\Delta_{ij}(x, y)=f(d(x+i, y+j)-d(x, y))+m(i, j) \quad (29)$$

where f( ) is a function monotonically increasing, according to $|d(x+i, y+j)-d(x,y)|$.

$$m(i, j)=QP[bn](i, j=-1, 0, +1) \quad (30)$$

When a coordinate where the block boundary that continues in the horizontal direction, is under the above conditions (iii), a horizontal block noise occurs, to weak smoothing characteristics of a pixel horizontally adjacent to a target pixel.

$$\text{When } i=0; \text{ and } j=-1, +1, m(0, j)=2\times QP[bn] \quad (31)$$

Similarly, for a vertical block noise:

$$\text{When } i=-1, +1; \text{ and } j=0, m(i, 0)=2\times QP[bn] \quad (32)$$

The above constitution underestimates weighting factors of two pixels facing each other across a target pixel being parallel to a block noise. This leads to a strong function of filter characteristics in the vertical direction with respect to the block noise direction. This enables to erase block noise and strongly preserve an edge being vertical with respect to the direction of a block boundary. As a result, it is possible to perform such a filtering that retains edge being important element of a picture signal as much as possible.

The operation of the filter 23 or 26 in FIG. 1 will be described in accordance with flow charts of FIGS. 13 through FIG. 18, which illustrate the actual computing procedure for the device as shown in FIG. 12.

In Step S1, against every pixel of a picture signal, a local mean <d(x, y)> for each pixel of a decoded picture is computed based on the equation (12).

In Step S2, similarly to S1, a local activity $\sigma_d^2(x, y)$ is computed based on the equation (13).

In Step S3, a block activity $\sigma_b^2[bn]$ for each picture block of 8×8 dot is computed based on the equation (14), and a quantizing parameter QP[bn] is read in.

In Steps S4, S5 and S25, a loop is turned on every picture block. In each loop, the following calculations is made on each block.

In Step S6, a mixing ratio $\lambda$ is computed based on the equation (16). At this time, $\delta_1$ is a fixed value.

In Step S7, a non-negative value m is determined based on the equation (20).

In Steps S8 and S9, if a mixing ratio $\lambda$ exceeds a limit range, the $\lambda$ is limited to $\lambda_{max}$ (see the equation (17)).

In Steps S10 and S11, if the block activity $\sigma_b^2[bn]$ of a picture block as computed in S3 is not more than a certain threshold value $\delta_2$ it is replaced with $\lambda=\lambda_{max}$, m=QP[bn], as indicated in the equation (22).

In Steps S12, S13, S14, S21, S22, S23 and S24, a loop is turned on every pixel in a picture block. Variables k and l are incremental in x and y directions, respectively. Since the size of the picture block is 8×8, there increases in a range of 0 to 7. Each of $x_b$ and $y_b$ is the upper left corner coordinate in a target pixel block.

In Step S16, it is determined whether when the variables k and l are 0 or 7, a target pixel exists on a block boundary as shown by the circles in FIG. 20.

In Steps S26, S27 and S28, when the variable l is 0, the target pixel is at the upper side of a target block $B_{11}$ in FIG. 20. Therefore, if a block $B_{01}$ adjacent to the upper side of the target block is $\sigma_b^2[bn-M] \leq \delta_2$, there is replaced with $\lambda=\lambda_{max}$, m=QP[bn] (see the equation (23) and the conditions (i)).

In Steps S29, S30 and S31, when the variable k is 7, the target pixel is at the right side of the target block $B_{11}$. Therefore, a block $B_{12}$ adjacent to the right of the target block is $\sigma_b^2[bn+1] \leq \delta_2$, there is replaced with $\lambda=\lambda_{max}$, m=QP[bn]

In Steps S32, S33 and S34, when the variable l is 7, the target pixel is at under side of the target block $B_{11}$. Therefore, if a block $B_{21}$ adjacent to the bottom of the target block is $\sigma_b^2[bn+M] \leq \delta_2$, there is replaced with $\lambda=\lambda_{max}$, m=QP[bn]

In Steps S35, S36 and S37, when the variable k is 0, the target pixel is at the left side of the target block $B_{11}$. Therefore, if a block $B_{10}$ adjacent to the bottom of the target block is $\sigma_b^2[bn-1] \leq \delta_2$, there is replaced with $\lambda=\lambda_{max}$, m=QP[bn].

In Steps 38 and S39, when the local activity $\sigma_d^2(x, y)$ is not less than the threshold value $\delta_3$, there is replaced with $\lambda=\lambda_{max}$, m=QP[bn] (see the equation (23) and the condition (ii)).

In Step 17, setting the variable i and j be ±1, a difference between a target pixel and its surrounding pixel is computed, and a non-negative value m is added to the absolute value that represents a magnitude of the difference (see the equation (19)). The inverse number of the equation (19) is employed as a weight w(i, j) of the target pixel (see the equation (21)).

In Steps 18 and 19, the sum A of the product of the weight computed in S17 and a pixel value of a corresponding pixel is computed. The sum B of the weight is computed. Then, A/B is computed to obtain a smoothing value s.

In Step S20, as in the equation (15), a target pixel value and a smoothing value is mixed according to a mixing ratio $\lambda$, to obtain a pixel value of the filtered target pixel.

Figure 19:
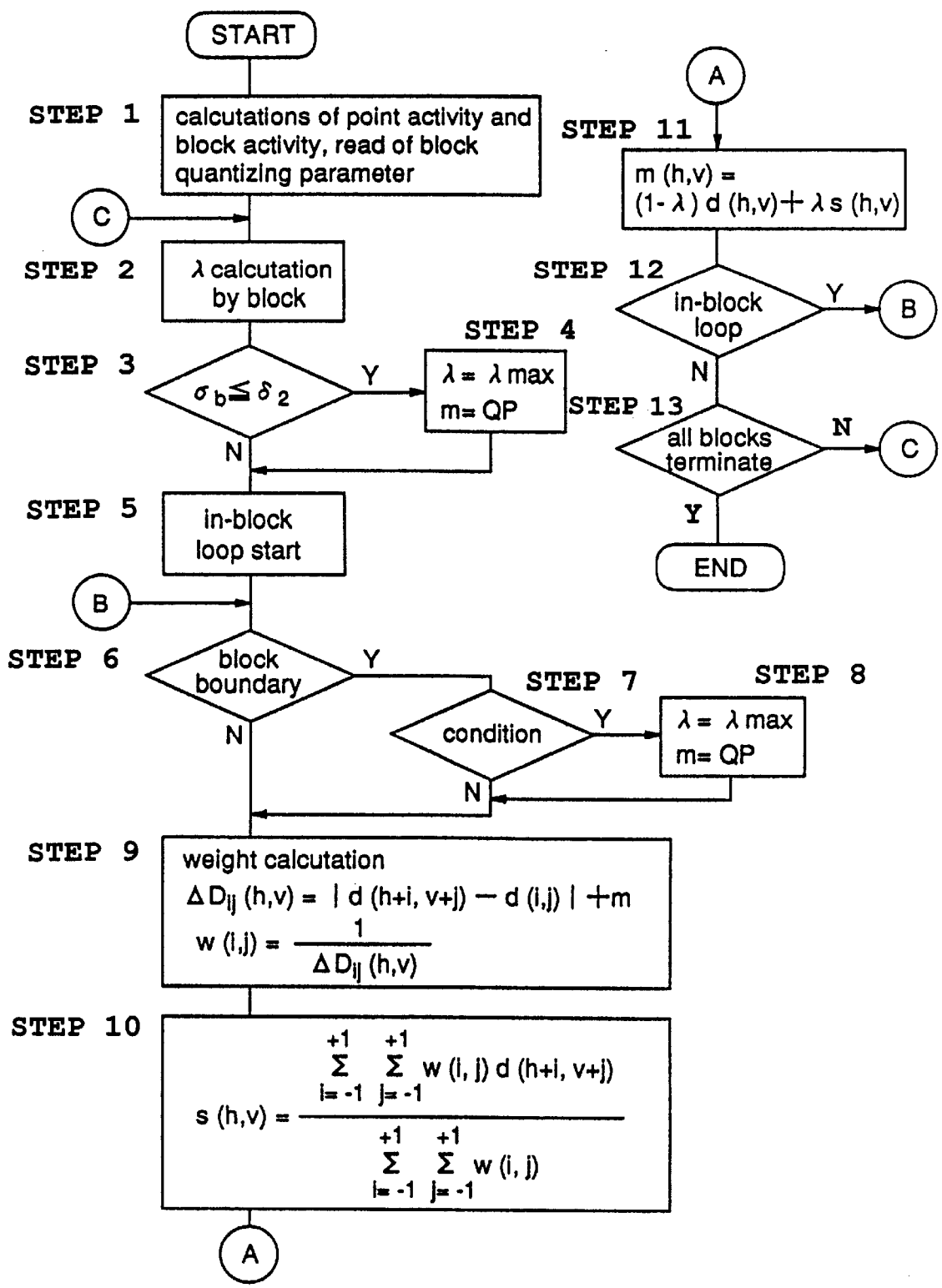
FIG. 19 is a schematic flow chart of a further filter controlling of the present invention.

FIG. 19 is a flow chart illustrating the outline of the processes shown in FIG. 13 through FIG. 18. Therefore, the corresponding relation alone is illustrated.

TABLE 1

| FIG. 19 | FIGS. 13–18 |
|---|---|
| Step 1 | S1, S2, S3 |
| Step 2 | S6 |
| Step 3, Step 4 | S10, S11 |
| Step 5, Step 12 | S12, S13, S14, S21, S22, S23, S24 |
| Step 6, Step 7, Step 8 | S16, S26 to S39 |
| Step 9 | S17 |
| Step 10 | S18, S19 |
| Step 11 | S20 |

[Embodiment 2]

In the embodiment 2, a constitution shown by the solid line 17 in FIG. 1 is replaced with that shown by a broken line 28. A filter having edge preserving property that is employed as the postfilter 26 is the same as described in the embodiment 1. This constitution allows to suppress a random noise that occurs in encoding and decoding of a picture, and also allows to smooth a picture signal and preserve edge. As a result, predictive error between the present picture signal and an input picture signal of the next frame can be decreased, and transmission bit quantity in encoding and decoding can be reduced.

A description will be given of a device and method that performs a processing in the case where a step computed by the subtracter 11 in FIG. 1, is below a certain threshold value, that is, the case where a step is not encoded in the encoder 12 in FIG. 1 (e.g., a meaningless block in the H. 261 standard). Therefore, this case corresponds to a picture of a corresponding picture block which has just being read from the frame memory 18 in FIG. 1. In this case, the picture stored in the frame memory has already filtered by the previous frame. Thus, against the picture data of the frame memory itself, another filtering is unnecessary. Accordingly, a filtering having edge preserving property is performed only on a meaningful block whose step has been encoded, and therefore, another filtering is not performed on the identical picture, thereby preventing a picture blur.

A description will be given of the case where the smoothing method of the present invention is applied to an in-loop filter (i.e., reference numeral 23 in FIG. 1) in the encoding part and the decoding part.

The numeral 20 in FIG. 1 designates a picture signal given motion compensation. Therefore, a quantizing parameter and a block activity which are stored by block do not agree with a DCT block division. For this, the value A in the equation (16) is fixed, and against the picture block given motion compensation, the equation (14) is computed from the equation (12). At this time, the motion compensation is computed using a pixel value that the frame memory stores prior to the filtering, and an input signal.

$$\lambda=\lambda_{fix} \tag{33}$$

When the block activity is smaller than a certain threshold value $\delta_2$, provided that:

$$\text{when } \sigma_b^2 \leq \delta_2, \lambda=\lambda_{max}, m=\delta_4 \tag{34}$$

the mean square error (the equation (35)) of between the input picture and the frame memory is greater than the mean square error (the equation (36)) of the input picture and the frame memory after filtering, an in-loop filter in a decoding loop is constituted by the equations (15), (18) and (21).

$$MSE1 = \frac{1}{64}\sum_{l=o}^{+7}\sum_{k=0}^{+7}(d(x+1, y+k) - i(x+1, y+k))^2 \tag{35}$$

$$MSE2 = \frac{1}{64}\sum_{l=o}^{+7}\sum_{k=0}^{+7}(m(x+1, y+k) - i(x+1, y+k))^2 \tag{36}$$

wherein d(x, y) is a picture value that is stored in the frame memory and given motion compensation; i(x, y) is an input picture signal; and m(x, y) is a picture value obtained by applying the filter of the present invention to a picture block given motion compensation.

Accordingly, the feature that the in-loop filter in the encoding loop and the decoding loop is constituted by the filter having edge preserving property, allows to reduce predictive error in input picture signal between the present frame and the next frame, thereby decreasing the transmission bit quantity.

An example of the equations (33) and (34) will be given below.

$$\lambda_{fix}=0.5, \delta_4=8 \tag{37}$$

As described above, according to the embodiment 2, the smoothing filter greatly decreases distortion occurred on a block boundary, leading to much visual improvement of picture quality. Further, since the smoothing process is performed by changing the smoothing filter characteristics according to the roughness of a decoding parameter and the activity of a picture signal, it is possible to decrease the resolution of the entire decoded picture, leading to a decoded picture that has high quality and is visually legible. Furthermore, since the smoothing filter is used in a decoding loop, predictive difference signal becomes small, thereby reducing the transmission bit quantity.

What is claimed is:

1. A picture signal smoothing device that performs a smoothing process by applying a smoothing filter that performs a filtering of a sampled and digitized picture signal by weighted mean of a target pixel and its surrounding pixels, including:

means for detecting a difference between the target pixel and the surrounding pixels;

means for taking an absolute value that represents a magnitude of the difference;

means for adding a non-negative value to the absolute value that represents a magnitude of the difference thus detected, wherein said non-negative value is equal for all surrounding pixels;

means for taking an inverse number of the value after the adding and thereby generating a weighting factor;

means for multiplying a value after taking of the inverse number, and the surrounding pixels value together;

means for taking a sum (A) of a plurality of values after the multiplying;

means for taking a sum (B) of a plurality of weighting factors alone;

means for normalizing the sum (A) by dividing the same by the sum (B) of the weighting factors; and means for smoothing the target pixel in accordance with the normalized sum (A).

2. A picture signal smoothing device that performs a smoothing process by applying a smoothing filter that performs a filtering of a sampled and digitized picture signal by weighted means of a target pixel and its surrounding pixel, including:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factors;

means for smoothing the target pixel in accordance with the normalized sum (A);

means for dividing a picture to be filtered into blocks; and means for appropriately changing a non-negative value to be added to the difference value between the target pixel and the surrounding pixel, according to roughness of quantizing parameter of each block, which is represented by quantizing characteristics utilized in encoding or decoding each block of a picture signal.

3. A picture signal smoothing device that performs a smoothing process by applying a smoothing filter that performs a filtering of a sampled and digitized picture signal by weighted means of a target pixel and its surrounding pixel, including:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factors;

means for smoothing the target pixel in accordance with the normalized sum (A);

means for dividing a picture to be filtered into blocks;

means for computing block activity indicating a change degree of a pixel in each block; and means for appropriately changing a non-negative value to be added to the difference value between the target pixel and the surrounding pixel, according to the block activity.

4. A picture signal smoothing device that performs a smoothing process by applying a smoothing filter that performs a filtering of a sampled and digitized picture signal by weighted means of a target pixel and its surrounding pixel, including:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factors;

means for smoothing the target pixel in accordance with the normalized sum (A);

means for dividing a picture to be filtered into blocks;

means for detecting whether a target pixel exists on a block boundary;

means that if the target pixel exits on a block boundary, detects a block activity of a block adjacent to the block boundary, i.e., adjacent block activity; and means for appropriately changing a non-negative value to be added to the difference value between the target pixel and the surrounding pixel, according to the adjacent block activity.

5. A picture signal smoothing device that performs a smoothing process by applying a smoothing filter that performs a filtering of a sampled and digitized picture signal by weighted means of a target pixel and its surrounding pixel, including:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factors;

means for smoothing the target pixel in accordance with the normalized sum (A);

means for dividing a picture to be filtered into blocks;

means for mixing a signal value after the smoothing process by block and a signal value prior to the smoothing process; and means for appropriately changing the mixing ratio according to a roughness of quantizing characteristics utilized in encoding and decoding each block of a picture signal.

6. A picture signal smoothing device that performs a smoothing process by applying a smoothing filter that performs a filtering of a sampled and digitized picture signal by weighted means of a target pixel and its surrounding pixel, including:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factors;

means for smoothing the target pixel in accordance with the normalized sum (A);

means for dividing a picture to be filtered into blocks;

means for mixing a signal value after the smoothing process by block and a signal value prior to the smoothing process; and means for appropriately changing the mixing ratio according to each block activity in a picture signal.

7. A picture signal smoothing device that performs a smoothing process by applying a smoothing filter that performs a filtering of a sampled and digitized picture signal by weighted means of a target pixel and its surrounding pixel, including:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factors;

means for smoothing the target pixel in accordance with the normalized sum (A);

means for dividing a picture to be filtered into blocks;

means for mixing a signal value after smoothing process by block and signal value prior to the smoothing process;

means for detecting whether a target pixel exists on a block boundary; and means that if the target pixel exists on a block boundary, appropriately changes the mixing ratio according to an adjacent block activity of a block adjacent to the target pixel.

8. A picture signal smoothing device that performs a filtering of a sampled and digitized picture signal by a smoothing filter, comprising:

means for detecting a difference between the target pixel and the surrounding pixel;

means for taking an absolute value of the difference;

means for adding a non-negative value to the absolute value of the difference thus detected;

means for taking an inverse number of the value after the adding and thereby generating a weighting factor;

means for multiplying a value after taking of the inverse number, and the surrounding pixel value together;

means for taking a sum (A) of a plurality of values after the multiplying;

means for taking a sum (B) of a plurality of weighting factors alone;

means for normalizing the sum (A) by dividing the same by the sum (B) of the weighting factor values;

means for smoothing the target pixel in accordance with the normalized sum (A);

means for dividing a picture to be filtered into blocks;

means for detecting whether a target pixel exists on a block boundary;

means for performing a filtering whose edge preserving property is weakened, if the target pixel exists on a block boundary;

means for performing a filtering having edge preserving property if the target pixel exists inside a block;

means for computing an activity of the target pixel from the target pixel value and the surrounding pixel value; and means for increasing the strength of the edge preserving property of a filter responsive to the activities of the target pixel if the target pixel exists on a block boundary and decreasing the strength of the edge preserving property of a filter responsive to the activities of the target pixel if the target pixel exists inside the block boundary.

9. A picture signal smoothing method in which a smoothing process is performed by applying a smoothing filter that performs a filtering of a sampled and digitized picture signal by a smoothing filter, comprising:

detecting a difference between a target pixel and its surrounding pixels;

taking an absolute value that represents a magnitude of the difference;

adding a non-negative value (m) to the absolute value that represents a magnitude of the difference thus detected, wherein said non-negative value is equal for all surrounding pixels;

taking an inverse number of a value after the adding thereby generating a weighting factor;

multiplying a value after taking of the inverse number and the surrounding pixels value together;

taking a sum (A) of a plurality of values after the multiplying;

taking a sum (B) of a plurality of weighting factor values alone;

normalizing the sum (A) by dividing same by the sum (B) of the weighting factors; and smoothing the target pixel in accordance with the normalized sum (A).

10. A picture signal smoothing method in which a smoothing process is performed by applying a smoothing filter that performs a filtering of a sampled and digitized picture signal by weighted means of a target pixel and its surrounding pixel, including the steps of:

- detecting a difference between a target pixel and its surrounding pixel;
- taking an absolute value of the difference;
- adding a non-negative value (m) to the absolute value of the difference thus detected;
- taking an inverse number of a value after the adding thereby generating a weighting factor;
- multiplying a value after taking of the inverse number and the surrounding pixel value together;
- taking a sum (A) of a plurality of values after the multiplying;
- taking a sum (B) of a plurality of values weighting factors alone;
- normalizing the sum (A) by dividing same by the sum (B) of the weighting factors;
- smoothing the target pixel in accordance with the normalized sum (A);
- dividing a picture to be filtered into blocks; and
- appropriately changing a non-negative value to be added to the difference value between the target pixel and the surrounding pixel, according to the roughness of quantizing parameter of each block, which is represented by quantizing characteristics utilized in encoding and decoding each block of a picture signal.

11. A picture signal smoothing method in which a smoothing process is performed by applying a smoothing filter that performs a filtering of a sampled and digitized picture signal by weighted means of a target pixel and its surrounding pixel, including the steps of:

- detecting a difference between a target pixel and its surrounding pixel;
- taking an absolute value of the difference;
- adding a non-negative value (m) to the absolute value of the difference thus detected;
- taking an inverse number of a value after the adding thereby generating a weighting factor;
- multiplying a value after taking of the inverse number and the surrounding pixel value together;
- taking a sum (A) of a plurality of values after the multiplying;
- taking a sum (B) of a plurality of values weighting factors alone;
- normalizing the sum (A) by dividing same by the sum (B) of the weighting factors;
- smoothing the target pixel in accordance with the normalized sum (A);
- dividing a picture to be filtered into blocks;
- computing a block activity indicating a change degree of a pixel in each block; and
- appropriately changing a non-negative value to be added to the difference value between the target pixel and the surrounding pixel, according to the block activity.

12. A picture signal smoothing method in which a smoothing process is performed by applying a smoothing filter that performs a filtering of a sampled and digitized picture signal by weighted means of a target pixel and its surrounding pixel, including the steps of:

- detecting a difference between a target pixel and its surrounding pixel;
- taking an absolute value of the difference;
- adding a non-negative value (m) to the absolute value of the difference thus detected;
- taking an inverse number of a value after the adding thereby generating a weighting factor;
- multiplying a value after taking of the inverse number and the surrounding pixel value together;
- taking a sum (A) of a plurality of values after the multiplying;
- taking a sum (B) of a plurality of values weighting factors alone;
- normalizing the sum (A) by dividing same by the sum (B) of the weighting factors;
- smoothing the target pixel in accordance with the normalized sum (A);
- dividing a picture to be filtered into blocks;
- detecting whether a target pixel exists on a block boundary;
- if the target pixel exists on a block boundary, appropriately changing a block activity of a block adjacent to the block boundary, i.e., adjacent block activity; and
- appropriately changing a non-negative value to be added to the difference value between the target pixel and the surrounding pixel, according to the adjacent block activity.

13. A picture signal smoothing method in which a smoothing process is performed by applying a smoothing filter that performs a filtering of a sampled and digitized picture signal by weighted means of a target pixel and its surrounding pixel, including the steps of:

- detecting a difference between a target pixel and its surrounding pixel;
- taking an absolute value of the difference;
- adding a non-negative value (m) to the absolute value of the difference thus detected;
- taking an inverse number of a value after the adding thereby generating a weighting factor;
- multiplying a value after taking of the inverse number and the surrounding pixel value together;
- taking a sum (A) of a plurality of values after the multiplying;
- taking a sum (B) of a plurality of values weighting factors alone;
- normalizing the sum (A) by dividing same by the sum (B) of the weighting factors;
- smoothing the target pixel in accordance with the normalized sum (A);
- dividing a picture to be filtered into blocks;
- mixing a signal value after the smoothing process by block and a signal value prior to the smoothing process; and
- appropriately changing the mixing ratio according to a roughness of quantizing parameter of each block, which is represented by quantizing characteristics utilized in encoding and decoding each block of a picture signal.

14. A picture signal smoothing method in which a smoothing process is performed by applying a smoothing filter that performs a filtering of a sampled and digitized picture signal by weighted means of a target pixel and its surrounding pixel, including the steps of:

detecting a difference between a target pixel and its surrounding pixel;

taking an absolute value of the difference;

adding a non-negative value (m) to the absolute value of the difference thus detected;

taking an inverse number of a value after the adding thereby generating a weighting factor;

multiplying a value after taking of the inverse number and the surrounding pixel value together;

taking a sum (A) of a plurality of values after the multiplying;

taking a sum (B) of a plurality of values weighting factors alone;

normalizing the sum (A) by dividing same by the sum (B) of the weighting factors;

smoothing the target pixel in accordance with the normalized sum (A);

dividing a picture to be filtered into blocks;

mixing a signal value after the smoothing process by block and a signal value prior to the smoothing process; and appropriately changing the mixing ratio according to each block activity in picture signal.

15. A picture signal smoothing method in which a smoothing process is performed by applying a smoothing filter that performs a filtering of a sampled and digitized picture signal by weighted means of a target pixel and its surrounding pixel, including the steps of:

detecting a difference between a target pixel and its surrounding pixel;

taking an absolute value of the difference;

adding a non-negative value (m) to the absolute value of the difference thus detected;

taking an inverse number of a value after the adding thereby generating a weighting factor;

multiplying a value after taking of the inverse number and the surrounding pixel value together;

taking a sum (A) of a plurality of values after the multiplying;

taking a sum (B) of a plurality of values weighting factors alone;

normalizing the sum (A) by dividing same by the sum (B) of the weighting factors;

smoothing the target pixel in accordance with the normalized sum (A);

dividing a picture to be filtered into blocks;

mixing a signal value after the smoothing process by block and a signal value prior to the smoothing process; detecting whether a target pixel exists on a block boundary; and if the target pixel exists on a block boundary, appropriately changing the mixing ratio according to an adjacent block activity of a block adjacent to the target pixel.

16. A picture signal smoothing method in which a filtering of a sampled and digitized picture signal is performed by a smoothing filter, comprising the steps of:

detecting a difference between a target pixel and its surrounding pixel;

taking an absolute value of the difference;

adding a non-negative value (m) to the absolute value of the difference thus detected;

taking an inverse number of a value after the adding thereby generating a weighting factor;

multiplying a value after taking of the inverse number and the surrounding pixel value together;

taking a sum (A) of a plurality of values after the multiplying;

taking a sum (B) of a plurality of weighting factor values alone;

normalizing the sum (A) by dividing the same by the sum (B) of the weighting factor values; and smoothing the target pixel in accordance with the normalized sum (A);

dividing a picture to be filtered into blocks;

detecting whether a target pixel exists on a block boundary;

performing a filtering whose edge preserving property is weakened, if the target pixel exists on a block boundary;

performing a filtering having edge preserving property if the target pixel exists inside a block;

computing an activity of the target pixel from a target pixel value and its surrounding pixel value; and increasing the strength of edge preserving property of a filter according to the activity of the target pixel if the target pixel exists on a block boundary and decreasing the strength of edge preserving of a filter according to the activity of the target pixel if the target pixel exists inside the block boundary and decreasing the strength of edge preserving of a filter according to the activity of the target pixel exists inside the block boundary.

17. A picture encoding device in which a filter is attached to a decoding loop having a frame memory for storing a signal that corresponds to either of at least one frame and at least one field, and an inter-frame encoding is performed by a corresponding pixel between an input signal and the frame memory, comprising:

means for detecting a difference between the target pixel and the surrounding pixels;

means for taking an absolute value of the difference;

means for adding a non-negative value (m) to the absolute value of the difference thus detected;

means for taking an inverse number (weighting factor) of the value after the adding;

means for multiplying a value after taking of the inverse number, and the surrounding pixels value together;

means for taking a sum (A) of the value after the multiplying;

means for taking a sum (B) of the inverse number (the weighting factor) alone;

means for dividing the sum (A) by the sum (B) of the weighting factor and then normalizing (A/B);

a filter having edge preserving property is employed as the above filter; and a picture signal after being processed in a picture signal smoothing device is input to the frame memory storing a picture signal of a preceding frame, as a local decoding signal.

18. A picture encoding device according to claim 17 including:

means for dividing a picture into blocks and computing an inter-frame difference by block;

means for determining whether the difference exceeds a certain threshold value; and means that only when the difference exceeds the threshold value, a corresponding block is processed by a filter having edge preserving property.

19. A picture encoding device in which a filter is attached to a decoding loop having a frame memory for storing a signal that corresponds to either of at least one frame and at least one field, and an inter-frame encoding is performed by a corresponding pixel between an input signal and the frame memory comprising:

means for detecting a difference between the target pixel and the surrounding pixel;

means for taking an absolute value of the difference;

means for adding a non-negative value (m) to the absolute value of the difference thus detected;

means for taking an inverse number (weighting factor) of the value after the adding;

means for multiplying a value after taking of the inverse number, and the surrounding pixel value together;

means for taking a sum (A) of the value after the multiplying;

means for taking a sum (B) of a plurality of weighting factor values alone; and means for dividing the sum (A) by the sum (B) of the weighting factor and then normalizing (A/B);

smoothing the target pixel in accordance with the normalized sum (A);

means for computing a motion vector;

means for reading a picture value stored in the frame memory with consideration of the motion vector; and a filter having edge preserving property, which filter processes an output signal of the frame memory.

20. A picture decoding device in which a filter is attached to a decoding loop having a frame memory for storing a signal that corresponds to either of at least one frame and at least one field, and an inter-frame decoding is performed by a corresponding pixel between an input signal and the frame memory comprising:

means for detecting a difference between the target pixel and the surrounding pixel;

means for taking an absolute value of the difference;

means for adding a non-negative value (m) to the absolute value of the difference thus detected;

means for taking an inverse number (weighting factor) of the value after the adding;

means for multiplying a value after taking of the inverse number, and the surrounding pixel value together;

means for taking a sum (A) of a plurality of values after the multiplying;

means for taking a sum (B) of a plurality of weighting factor values alone; and means for dividing the sum (A) by the sum (B) of the weighting factor values and then normalizing (A/B);

a filter having edge preserving property is employed as the above filter; and a picture signal after being processed in a picture signal smoothing device is input to a frame memory storing a picture signal of the previous frame, as a decoding signal.

21. A picture decoding device according to claim 20 including:

means for dividing a picture into blocks and computing an inter-frame difference by block;

means for determining whether the difference exceeds a certain threshold value; and means that only when the difference exceeds the threshold value, a corresponding block is processed by a filter having edge preserving property.

22. A picture decoding device in which a filter is attached to a decoding loop having a frame memory for storing a signal that corresponds to either of at least one frame and at least one filed, and an inter-frame decoding is performed by a corresponding pixel between an input signal and the frame memory, comprising:

means for detecting a difference between the target pixel and the surrounding pixel;

means for taking an absolute value of the difference;

means for adding a non-negative value (m) to the absolute value of the difference thus detected;

means for taking an inverse number (weighting factor) of the value after the adding;

means for multiplying a value after taking of the inverse number, and the surrounding pixel value together;

means for taking a sum (A) of a plurality of values after the multiplying;

means for taking a sum (B) of a plurality of weighting factor values alone; and means for dividing the sum (A) by the sum (B) of the weighting factor values and then normalizing (A/B);

means for computing a motion vector;

means for reading a picture value stored in the frame memory with consideration of the motion vector; and a filter having edge preserving property, which filter processes an output signal of the frame memory.

23. A picture encoding method in which a filter is attached to a decoding loop having a frame memory for storing a signal that corresponds to either of at least one frame and at least one field, and an inter-frame encoding is performed by a corresponding pixel between an input signal and the frame memory, comprising:

detecting a difference between the taraet pixel and its surrounding pixel;

taking an absolute value of the difference;

adding a non-negative value (m) to the absolute value of the difference thus detected;

taking an inverse number (weighting factor) of a value after the adding;

multiplying a value after taking of the inverse number and the surrounding pixel value together;

taking a sum (A) of a plurality of values after the multiplying;

taking a sum (B) of a plurality of weighting factor values alone;

dividing the sum (A) by the sum (B) of the weighting factor values and then normalizing (A/B);

performing a process using a filter having edge preserving property; and inputting a picture signal after being processed in a picture signal smoothing device to the frame memory storing a picture signal of a preceding frame, as a local decoding signal.

24. A picture encoding method according to claim 23 including:

dividing a picture into blocks and computing an inter-frame difference by block;

determining whether the difference exceeds a certain threshold value; and only when the difference exceeds the threshold value, a corresponding block is processed by a filter having edge preserving property.

25. A picture encoding method in which a filter is attached to a decoding loop having a frame memory for storing a signal that corresponds to either of at least one frame and at least one field, and an inter-frame encoding is performed by a corresponding pixel between an input signal and the frame memory, comprising:

detecting a difference between the target pixel and its surrounding pixel;

taking an absolute value of the difference;

adding a non-negative value (m) to the absolute value of the difference thus detected;

taking an inverse number (weighting factor) of a value after the adding;

multiplying a value after taking of the inverse number and the surrounding pixel value together;

taking a sum (A) of a plurality of values after the multiplying;

taking a sum (B) of a plurality of weighting factor values alone;

dividing the sum (A) by the sum (B) of the weighting factor values and then normalizing (A/B);

computing a motion vector;

reading a picture value stored in the frame memory with consideration of the motion vector; and processing an output signal of the frame memory by using a filter having edge preserving property.

26. A picture encoding method in which a filter is attached to a decoding loop having a frame memory for storing a signal that corresponds to either of at least one frame and at least one field, and an inter-frame encoding is performed by a corresponding pixel between an input signal and the frame memory, comprising:

detecting a difference between the target pixel and its surrounding pixel;

taking an absolute value of the difference;

adding a non-negative value (m) to the absolute value of the difference thus detected;

taking an inverse number (weighting factor) of a value after the adding;

multiplying a value after taking of the inverse number and the surrounding pixel value together;

taking a sum (A) of a plurality of values after the multiplying;

taking a sum (B) of a plurality of weighting factor values alone;

dividing the sum (A) by the sum (B) of the weighting factor values and then normalizing (A/B);

performing a process using a filter having edge preserving property; and inputting a picture signal after being processed in a picture signal smoothing device to the frame memory storing a picture signal of a preceding frame, as a decoding signal.

27. A picture decoding method according to claim 26 further comprising:

dividing a picture into blocks and computing an inter-frame difference by block;

determining whether the difference exceeds a certain threshold value; and only when the difference exceeds a certain threshold value, a corresponding block is processed by a filter having an edge preserving property.

28. A picture decoding method in which a filter is attached to a decoding loop having a frame memory for storing a signal that corresponds to either of at least one frame and at least one filed, and an inter-frame decoding is performed by a corresponding pixel between an input signal and the frame memory, comprising:

detecting a difference between a target pixel and its surrounding pixels;

taking an absolute value that represents a magnitude of the difference;

adding a non-negative value (m) to the absolute value that represents a magnitude of the difference thus detected, wherein said non-negative value is equal for all surrounding pixels;

taking an inverse number of a value after the adding thereby generating a weighting factor;

multiplying a value after taking of the inverse number and the surrounding pixels value together;

taking a sum (A) of a plurality of values after the multiplying;

taking a sum (B) of a plurality of weighting factor values alone;

normalizing the sum (A) by dividing same by the sum (B) of the weighting factors; and smoothing the target pixel in accordance with the normalized sum (A);

computing a motion vector;

reading a picture value stored in te frame memory with consideration of a motion vector; and processing an output signal of the frame memory by using a filter having edge preserving property.

\* \* \* \* \*